US011772271B2

(12) United States Patent
Yu et al.

(10) Patent No.: US 11,772,271 B2
(45) Date of Patent: Oct. 3, 2023

(54) METHOD AND COMPUTING SYSTEM FOR OBJECT RECOGNITION OR OBJECT REGISTRATION BASED ON IMAGE CLASSIFICATION

(71) Applicant: MUJIN, INC., Tokyo (JP)

(72) Inventors: Jinze Yu, Tokyo (JP); Jose Jeronimo Moreira Rodrigues, Tokyo (JP)

(73) Assignee: MUJIN, INC., Tokyo (JP)

( * ) Notice: Subject to any disclaimer, the term of this patent is extended or adjusted under 35 U.S.C. 154(b) by 394 days.

(21) Appl. No.: 16/991,466

(22) Filed: Aug. 12, 2020

(65) Prior Publication Data
US 2021/0216767 A1     Jul. 15, 2021

Related U.S. Application Data

(60) Provisional application No. 62/959,182, filed on Jan. 10, 2020.

(51) Int. Cl.
*B25J 9/16*     (2006.01)
*G06N 20/00*    (2019.01)
(Continued)

(52) U.S. Cl.
CPC .............. *B25J 9/1697* (2013.01); *B25J 9/163* (2013.01); *B25J 9/1661* (2013.01); *B25J 9/1664* (2013.01);
(Continued)

(58) Field of Classification Search
CPC ...... G06V 20/10; G06V 10/22; G06V 10/443; G06V 10/462; G06V 10/56;
(Continued)

(56) References Cited

U.S. PATENT DOCUMENTS 9,120,622 B1 *  9/2015  Elazary .................. B25J 9/1697
11,049,278 B2 *  6/2021  Song ........................ B07C 3/10
(Continued)

FOREIGN PATENT DOCUMENTS

CN     102136074 A    7/2011
CN     102582664 A    7/2012
(Continued)

OTHER PUBLICATIONS

P. P. Koltsov, "Comparative Study of Texture Detection and Classification Algorithms", Feb. 11, 2011, Computational Mathematics and Mathematical Physics, vol. 51, No. 8, 1460-1466 (Year: 2011).*
Office Action dated Dec. 3, 2020 in Japanese Patent Appl. No. 2020-181951 (with English Translation).

*Primary Examiner* — Jonathan L Sample
*Assistant Examiner* — Elizabeth Rose Neleski
(74) *Attorney, Agent, or Firm* — MEDLER FERRO WOODHOUSE & MILLS PLLC

(57) ABSTRACT

A computing system and method for object recognition is presented. The method includes the computing system obtaining an image for representing the one or more objects, and generating a target image portion associated with one of the one or more objects. The computing system determines whether to classify the target image portion as textured or textureless, and selects a template storage space from among a first and second template storage space, wherein the first template storage space is cleared more often relative to the second template storage space. The first template storage space is selected in response to a textureless classification, and the second template storage space is selected as the template storage space in response to a textured classification. The computing system performs object recognition based on the target image portion and the selected template storage space.

20 Claims, 44 Drawing Sheets

(51) Int. Cl.
*B25J 13/08* (2006.01)
*G06V 20/10* (2022.01)
*G06V 10/22* (2022.01)
*G06V 10/44* (2022.01)
*G06F 18/241* (2023.01)
*B65G 61/00* (2006.01)

(52) U.S. Cl.
CPC ............ *B25J 13/08* (2013.01); *G06F 18/241* (2023.01); *G06N 20/00* (2019.01); *G06V 10/22* (2022.01); *G06V 10/443* (2022.01); *G06V 20/10* (2022.01); *B65G 61/00* (2013.01); *G06V 2201/06* (2022.01); *G06V 2201/07* (2022.01)

(58) Field of Classification Search
CPC ............ G06V 2201/06; G06V 2201/07; B25J 9/163; B25J 9/1661; B25J 9/1664; B25J 9/1697; B25J 13/08; G06K 9/6268; G06N 20/00; B65G 61/00; G05B 2219/37555; G05B 2219/40053; G05B 2219/40564
See application file for complete search history.

(56) References Cited

U.S. PATENT DOCUMENTS

| | | | | |
|---|---|---|---|---|
| 2011/0013209 | A1* | 1/2011 | Yamazaki | G06F 3/1211 358/1.9 |
| 2014/0289323 | A1* | 9/2014 | Kutaragi | G06Q 50/01 709/206 |
| 2018/0098024 | A1* | 4/2018 | Liu | H04N 9/7921 |
| 2019/0325661 | A1 | 10/2019 | Baumbach et al. | |

FOREIGN PATENT DOCUMENTS

| | | |
|---|---|---|
| CN | 108664651 A | 10/2018 |
| CN | 109214420 A | 1/2019 |
| CN | 109886124 A | 6/2019 |
| JP | H07-088791 A | 4/1995 |
| JP | H11-333770 A | 12/1999 |
| JP | 2013-114547 A | 6/2013 |
| JP | 2014-029664 A | 2/2014 |

* cited by examiner

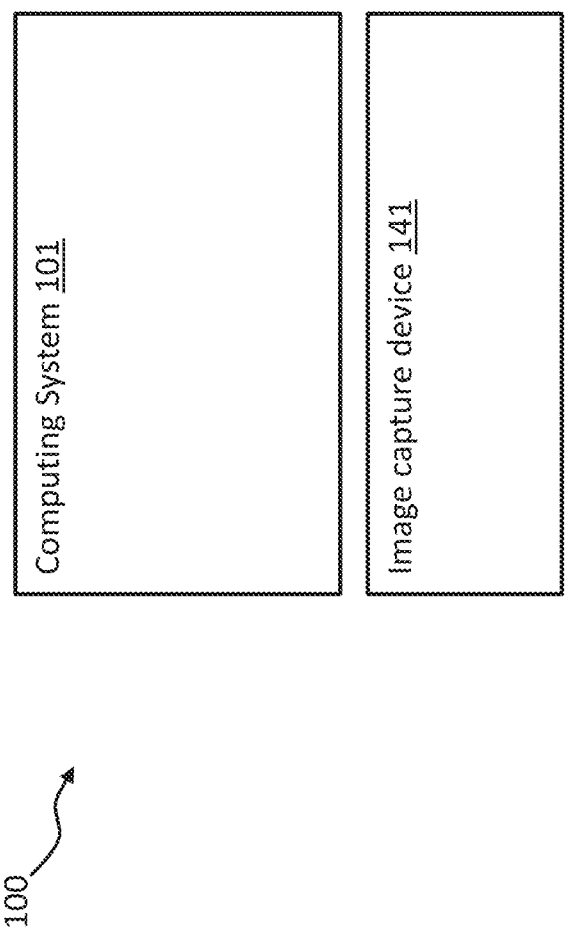

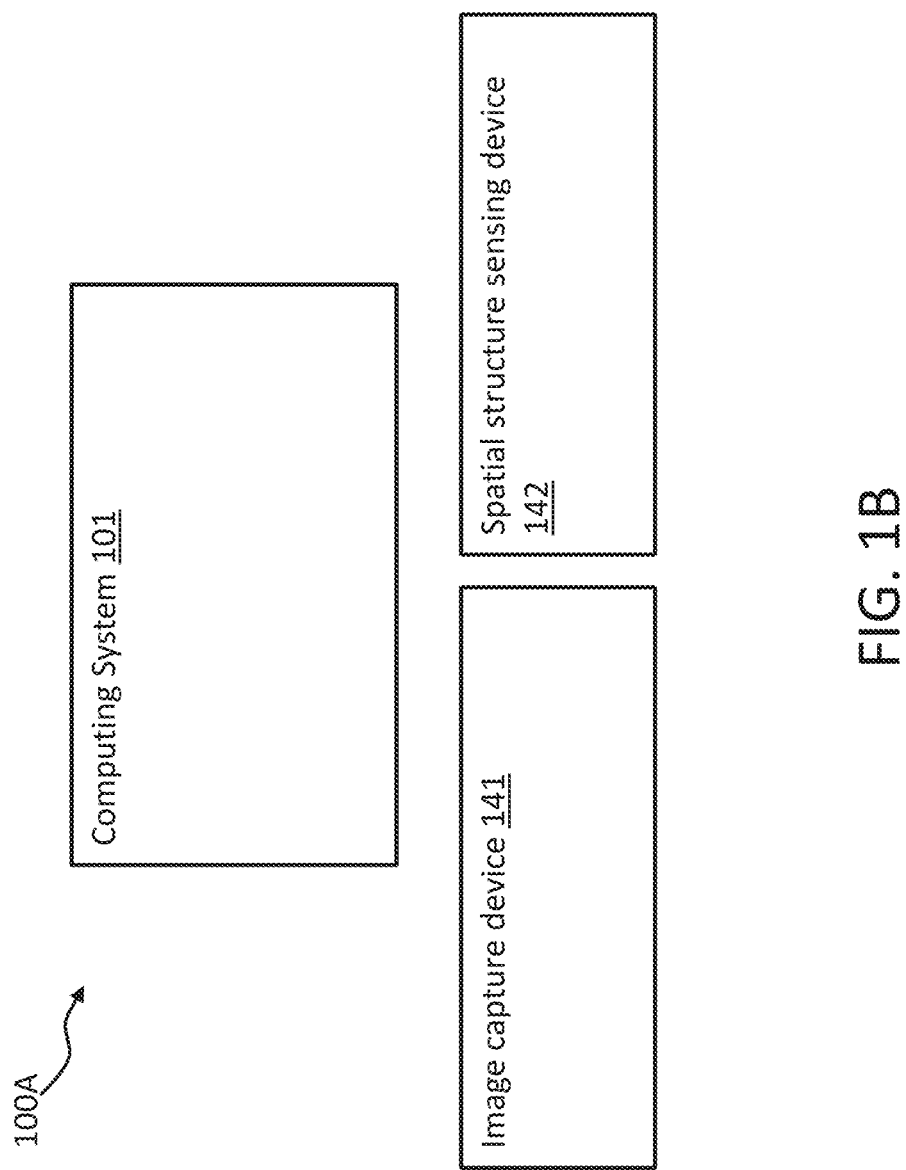

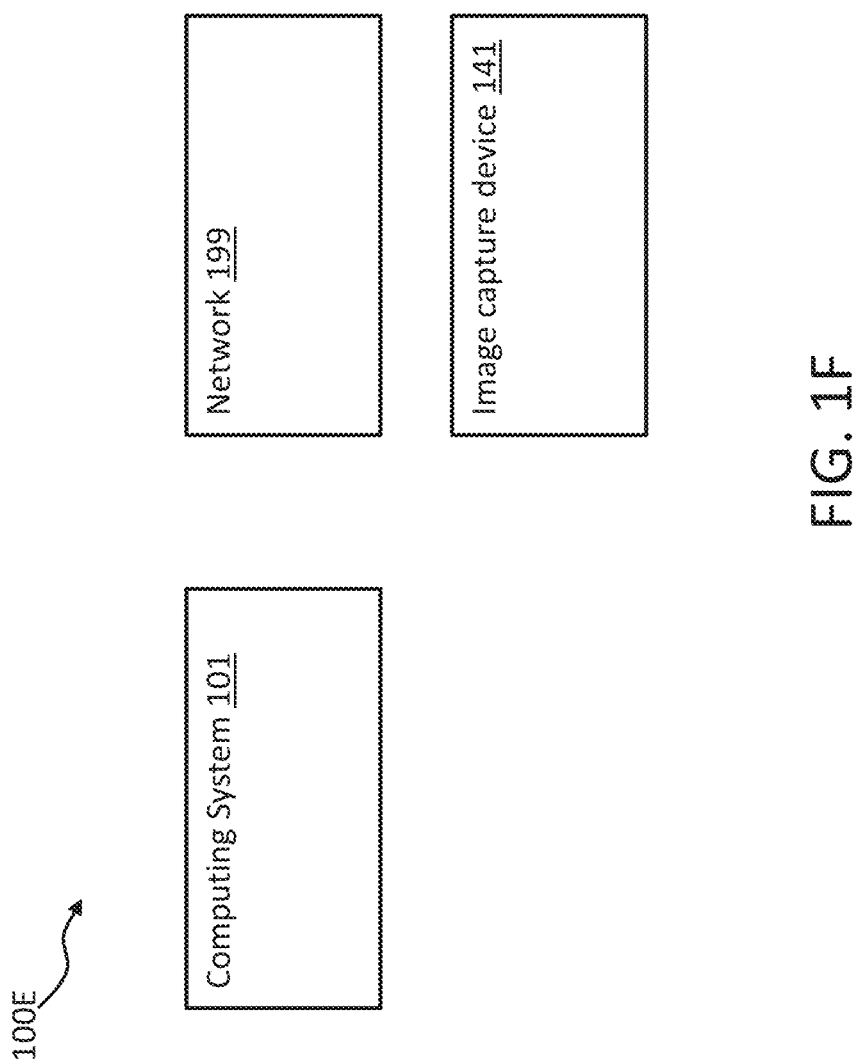

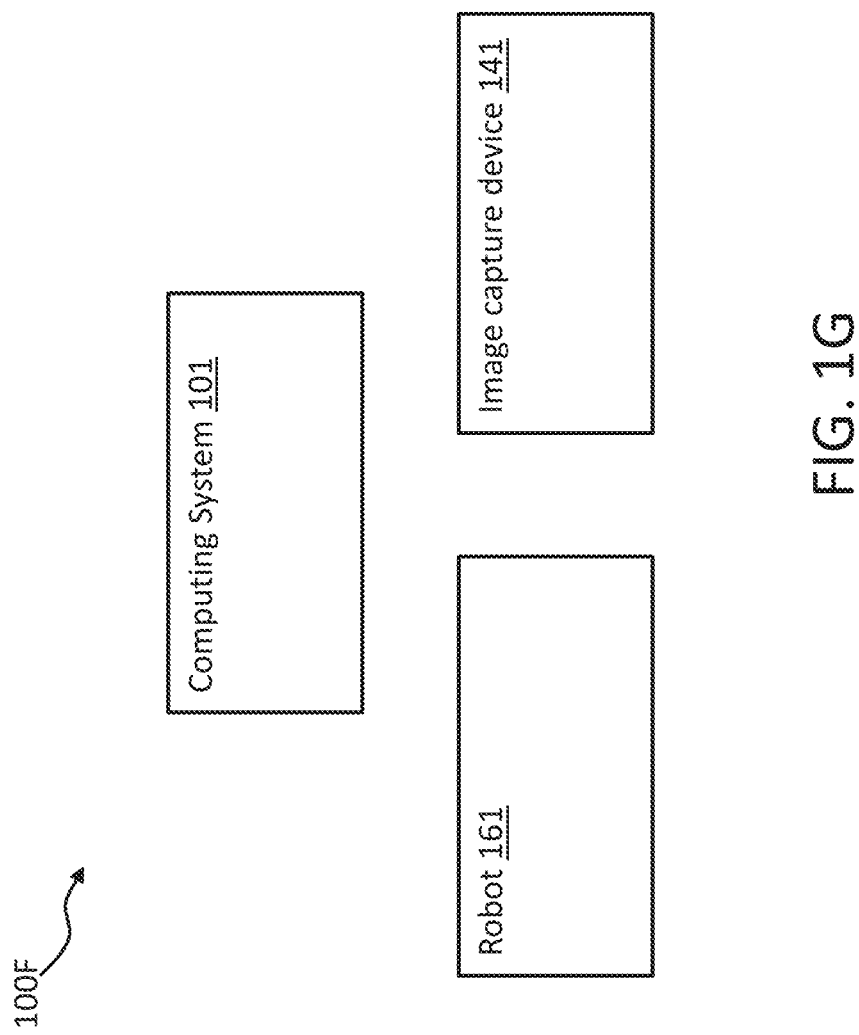

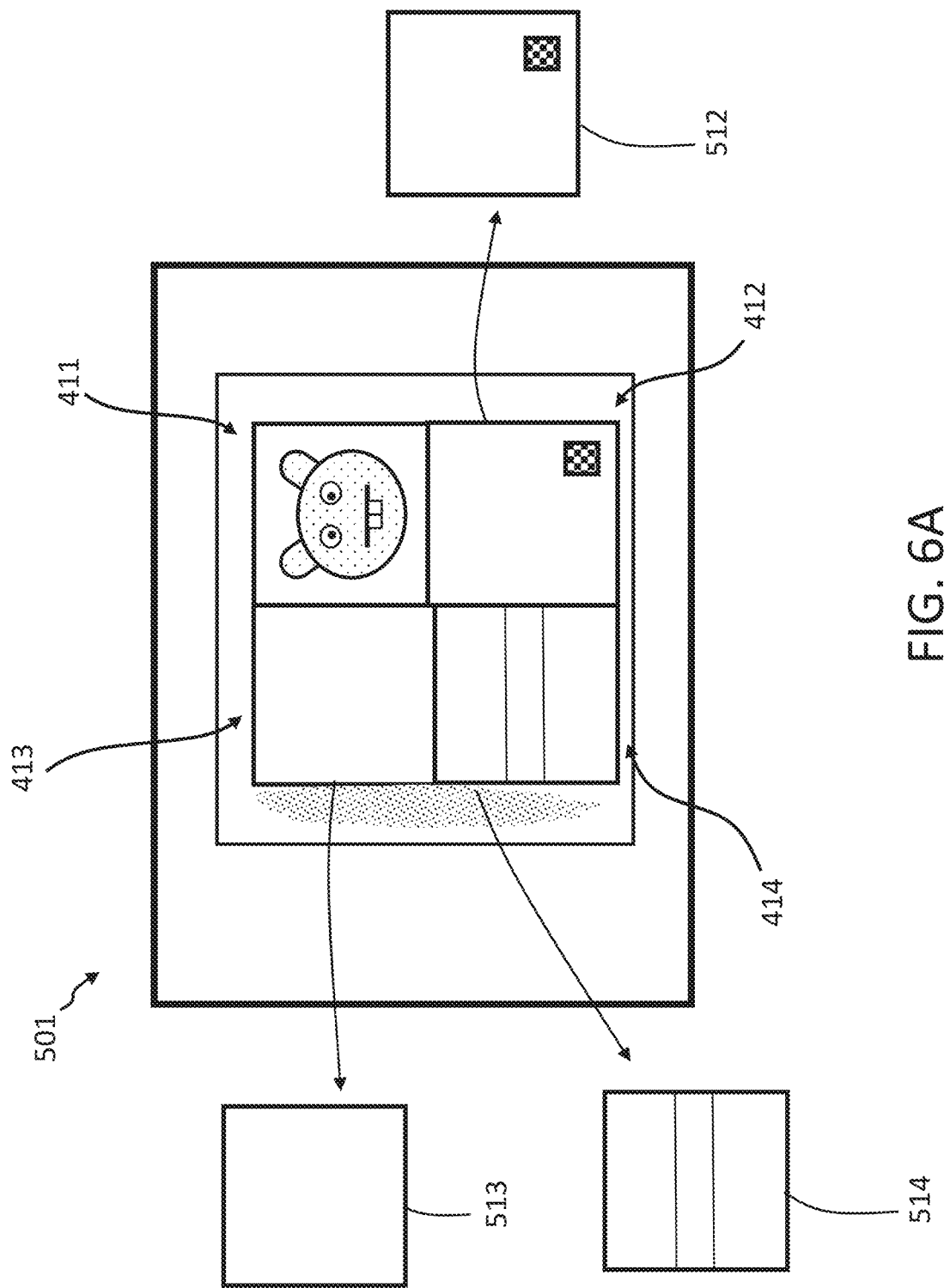

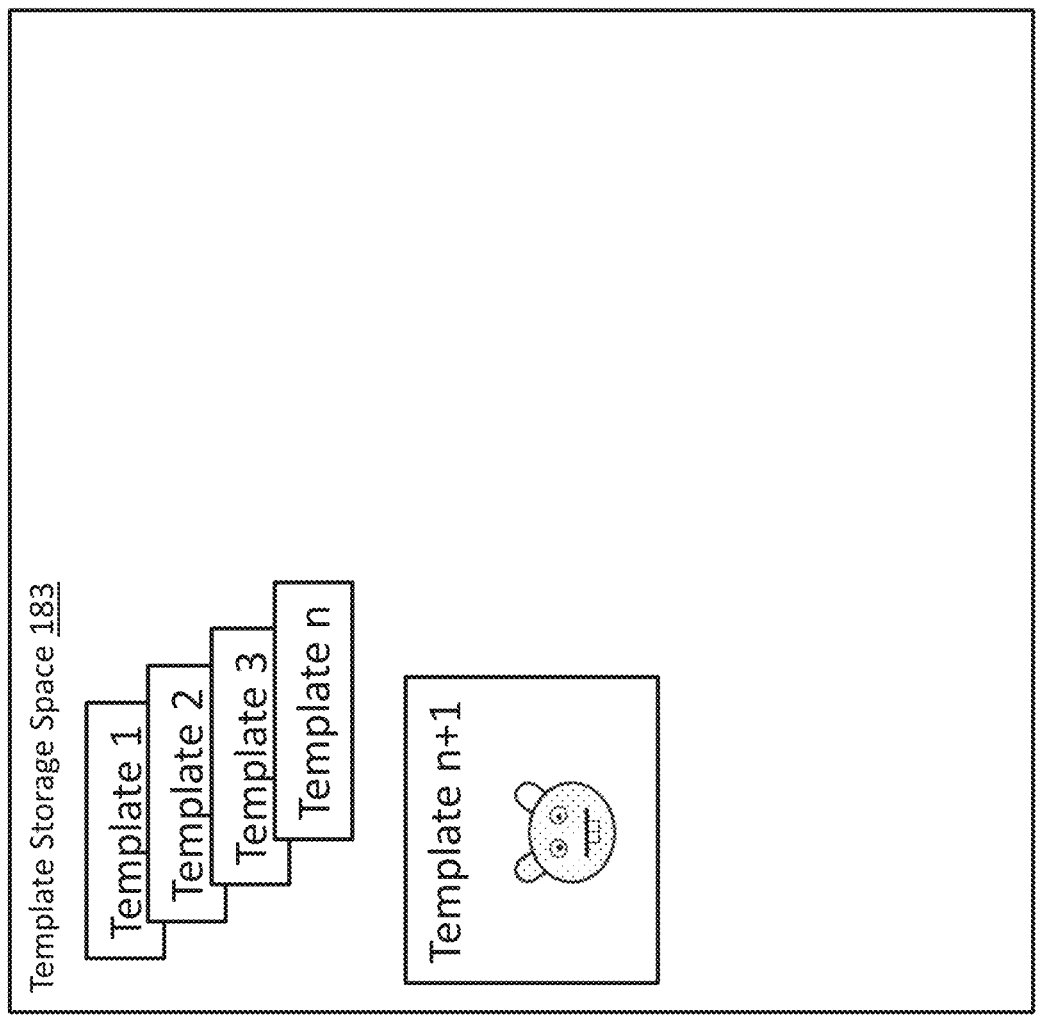

ated Jan. 10, 2020, the entire
METHOD AND COMPUTING SYSTEM FOR OBJECT RECOGNITION OR OBJECT REGISTRATION BASED ON IMAGE CLASSIFICATION

CROSS-REFERENCE TO RELATED APPLICATION(S)

This application claims the benefit of U.S. Provisional Application No. 62/959,182, entitled "A Robotic System with Object Detection" and filed Jan. 10, 2020, the entire content of which is incorporated by reference herein.

FIELD OF THE INVENTION

The present disclosure is related to computing systems and methods for performing object recognition or object registration based on how an image or a portion thereof has been classified, and more specifically based on whether the image or the portion thereof has been classified as being textured or textureless.

BACKGROUND OF THE INVENTION

As automation becomes more common, images which represent objects may be used to automatically extract information about the objects, such as boxes or other packages in a warehouse, factory, or retail space. The images may facilitate tasks such as automated package tracking, inventory management, or robot interaction with the objects.

SUMMARY

In an embodiment, a computing system including a non-transitory computer-readable medium and at least one processing circuit is provided. The communication interface may be configured to communicate with a robot and with an image capture device. The at least one processing circuit is configured to perform the following method when one or more objects are or have been in a field of view of the image capture device: obtaining an image for representing the one or more objects, wherein the image is generated by the image capture device; generating a target image portion from the image, wherein the target image portion is a portion of the image associated with an object of the one or more objects; and determining whether to classify the target image portion as textured or textureless. The method also includes selecting a template storage space from among a first template storage space and a second template storage space based on whether the target image portion is classified as textured or textureless, wherein the first template storage space is cleared more often relative to the second template storage space, wherein the first template storage space is selected as the template storage space in response to a determination to classify the target image portion as being textureless, and the second template storage space is selected as the template storage space in response to a determination to classify the target image portion as being textured; perform object recognition based on the target image portion and the selected template storage space. The method further includes generating a movement command for causing robot interaction with at least the object, wherein the movement command is generated based on a result from the object recognition. In some cases, the method may be performed when the at least one processing circuit executes a plurality of instructions on the non-transitory computer-readable medium.

BRIEF DESCRIPTION OF THE FIGURES

FIGS. 1A through 1H illustrate a system for performing object recognition or object registration based on image classification, according to embodiments hereof.

FIGS. 6A-6I illustrate aspects of performing object recognition or object registration, according to embodiments hereof.

FIGS. 9A-9D illustrate clearing of textureless templates, according to embodiments hereof.

DETAILED DESCRIPTION OF THE FIGURES

Figure 1C:
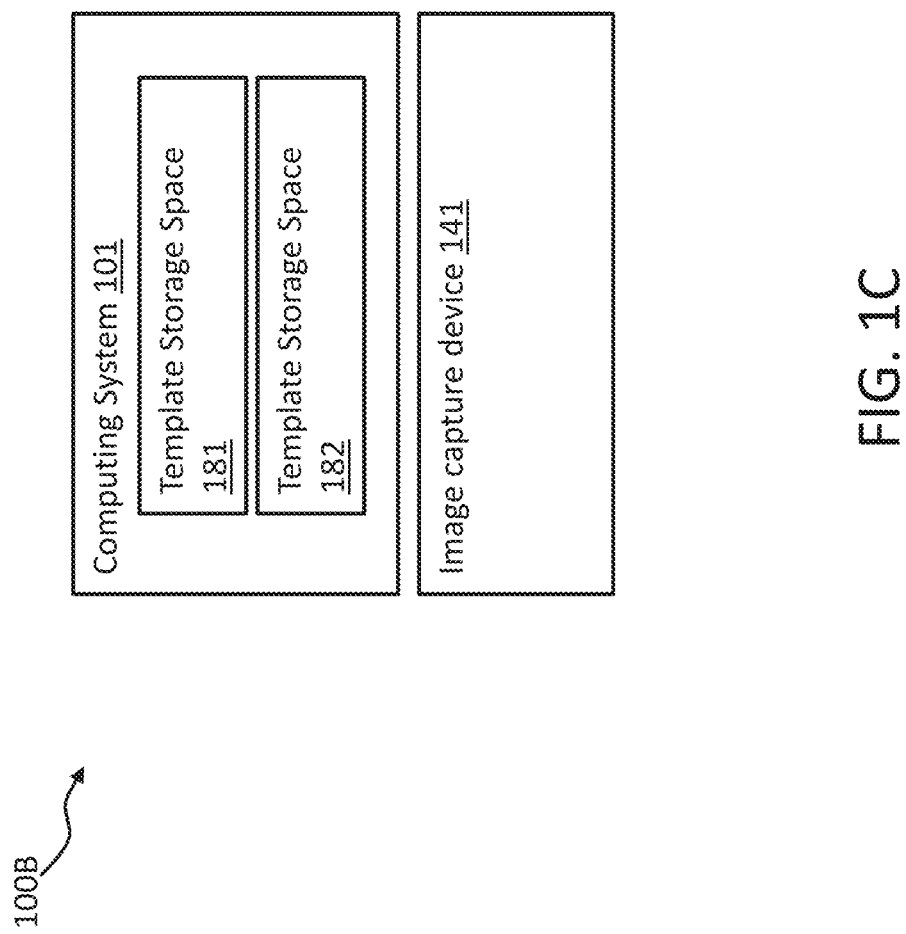

One aspect of the present disclosure provides systems and methods for automatically performing object recognition or object registration based on an image classification, such as a classification of whether an image or a portion thereof is textured or textureless. The image may capture or otherwise represent one or more objects, such as boxes on a pallet, and the object registration (if it is performed) may be used to determine visual characteristics or other characteristics of the one or more objects, and to generate one or more templates which describes those characteristics. In some cases, the one or more templates may be used to perform object recognition. A result of the object recognition may be used to, e.g., perform inventory management, facilitate robot interaction with the one or more objects, or fulfill some other purpose. In some cases, a template that is generated may be classified as being textured or textureless. A textured template may be a template that is generated based on an image or a portion of an image (also referred to as an image portion) that is classified as being textured, while a textureless template may be a template that is generated based on an image or image portion that is classified as being textureless. In some cases, the textured or textureless classification may refer to visual texture in the image or image portion, or more specifically whether the image or image portion has a certain level of visual texture. In some cases, the visual texture may affect whether object recognition can be performed in a robust manner based on matching a visual characteristic of an object to one or more visual features described in the template.

In an embodiment, a textureless template(s) may be used in a temporary manner, while a textured template(s) may be used in a more long-term manner. For instance, the textureless template(s) may used to facilitate a specific robot task, such as a task involving a robot de-palletizing a stack of boxes. In such instances, the textureless template may be generated based on an appearance and/or a physical structure of a particular box in the stack. The box may in some scenarios have few or no visual markings on a surface thereof. The textureless template may describe a box design, or more generally an object design, associated with the box. For example, the textureless template may describe a visual design and/or a physical design that forms the box design. The textureless template may be used to facilitate de-palletizing other boxes in the stack, especially other boxes which have the same box design, and which may thus match the textureless template. In this embodiment, the textureless template may be deleted or otherwise cleared after completion of the de-palletization task. For instance, the textureless template may be stored in a cache or other short-term template storage space, and the cache may be cleared upon completion of the de-palletization task. In some cases, the textureless template may include a textureless flag. When the de-palletization task is complete, the textureless flag may cause the textureless template to be cleared. Thus, one aspect of the embodiments herein relates to using a textureless template(s) for a particular robot task involving a group of objects (e.g., boxes on a pallet), wherein the textureless template(s) may be generated based on an object within that group, but not reusing the textureless templates for another, subsequent task which involves another group of objects. The textureless template may be useful for, e.g., performing object recognition on objects in the former group, but may have less relevance for objects in the latter group.

In an embodiment, a textured template(s) may also be used to facilitate a robot task or any other task, and may further be reused for other, subsequent tasks. Thus, the textured template(s) may be more permanent than the textureless template(s). In some cases, the textured template(s) may be stored in a long-term database or other long-term template storage space. As discussed below in more detail, using the textureless template(s) in a temporary manner and using the textured template(s) in a more long-term manner may provide technical advantages such as reducing storage resources needed to store templates, and/or improving a speed by which object recognition is performed.

FIG. 1A illustrates a system 100 for performing or facilitating automatic object recognition or object registration (the term "or" is used herein to refer to "and/or"). The system 100 may include a computing system 101 and an image capture device 141 (also referred to as an image sensing device). The image capture device 141 (e.g., a 2D camera) may be configured to capture or otherwise generate an image which represents an environment in a field of view of the image capture device 141. In some cases, the environment may be, e.g., a warehouse or factory. In such cases, the image may represent one or more objects in the warehouse or factory, such as one or more boxes or other containers which are to receive robot interaction. The computing system 101 may receive the image directly or indirectly from the image capture device 141, and process the image to, e.g., perform object recognition. As discussed below in more detail, the object recognition may involve identifying objects that have been encountered by the image capture device 141, or that more specifically has been in the device's field of view. The object recognition may further involve determining whether an appearance of the object matches any existing template stored in a template storage space, and/or whether the object's structure matches any existing template in the template storage space. In some situations, the object recognition operation may fail to recognize the object, such as when the appearance of the object does not match any existing template in the template storage space, and/or when the object's structure does not match any existing template in the template storage space. In some implementations, if the object recognition operation fails to recognize the object, the computing system 101 may be configured to perform object registration. The object registration may involve, e.g., storing information regarding the appearance of the object (also referred to as the visual appearance thereof), regarding a physical structure of the object (also referred to as an object structure or structure of the object), and/or regarding any other characteristic of the object, and storing that information as a new template in the template storage space. The new template may be used for a subsequent object recognition operation. In some instances, the computing system 101 and the image capture device 141 may be located in the same premises, such as a warehouse or factory. In some instances, the computing system 101 and the image capture device 141 may be remote from each other. For example, the computing system 101 may be located at a data center that provides a cloud computing platform.

In an embodiment, the system 100 may include a spatial structure sensing device, such as a 3D camera. More particularly, FIG. 1B illustrates a system 100A (which may be an embodiment of system 100) that includes the computing system 101, the image capture device 141, and further includes a spatial structure sensing device 142. The spatial structure sensing device 142 may be configured to sense a physical structure of an object in its field of view, and/or sense how the object is arranged in 3D space. For example, the spatial structure sensing device 142 may include a depth-sensing camera (e.g., a time-of-flight (TOF) camera or a structured light camera) or any other 3D camera. In an embodiment, the spatial structure sensing device 142 may be configured to generate sensed structure information (also referred to as spatial structure information), such as a point cloud. More specifically, the sensed structure information may include depth information, such as a set of depth values in a depth map, that describe depth of various locations on a surface the object. The depth may be relative to the spatial structure sensing device 142 or some other reference frame. In some cases, the sensed structure information (e.g., point cloud) may include 3D coordinates, such as $[X \ Y \ Z]^T$ coordinates, which identify or otherwise describe respective locations on one or more surfaces of an object. In some cases, the sensed structure information may describe the object's physical structure. For example, the depth information in the point cloud (or other form of sensed structure information) may describe a size of the object or a shape of the object. The size of the object (also referred to as object size) may describe, e.g., the object's dimensions, such as a combination of a length and a width of a container or other object, or a combination of the length, width, and a height of the container. The shape of the object (also referred to as object shape) may describe, e.g., the object's physical profile, as discussed below in more detail.

As stated above, an object recognition operation may be performed to determine whether an object matches an existing template (if any) stored in a template storage space. If the object does not match any existing template in the template storage space (or if the template storage space has no templates therein), an object registration operation may be performed to generate a new template based on an appearance and/or other characteristic of the object if. For instance, FIG. 1C illustrates a system 100B (which may be an embodiment of the system 100/100A) that has a first template storage space 181 and a second template storage space 182. In an embodiment, each of the template storage spaces 181, 182 may be a space in a storage device or other non-transitory computer-readable medium, wherein the space is allocated or otherwise used to store one or more templates for object recognition. In some cases, the first template storage space 181 and/or the second template storage space 182 may include a computer file for storing templates or other template information. In some cases, the template storage space 181/182 may include a range or ranges of memory addresses that are allocated to or otherwise used for storing templates or other template information. In the above cases, the template storage space 181/182 may refer to a virtual space, because the computer file or range(s) of memory addresses may be virtual locations in memory that can be mapped to different physical locations in a storage device. In some cases, the first template storage space 181 and/or the second template storage space 182 may refer to a physical space on the storage device.

As discussed in more detail below, a template in the template storage space 181/182 may describe a particular object design associated with an object or a group of objects. For example, if the group of objects are boxes or other containers, the object design may refer to a box design or other container design associated with the containers. In some cases, the object design may refer to, e.g., a visual design or visual marking which defines or otherwise forms part of an appearance of one or more surfaces of the object, or which defines some other visual characteristic of the object. In some cases, the object design may refer to, e.g., a physical design which defines or otherwise describes a physical structure or other physical characteristic associated with the object. In an embodiment, the template may include a visual feature description, which may include information that describes the visual design. For instance, the visual feature description may include an image or image portion which represents or is otherwise associated with the appearance of the object, or include information (e.g., a list of descriptors) which summarizes or otherwise describes visual features in the image or image portion. In an embodiment, the template may include an object structure description, which may include information that describes the physical design. For example, the object structure description may include a value(s) describing the object size associated with the object design, and/or may include a point cloud or computer-aided design (CAD) model which describes an object shape associated with the object design.

Figure 1D:
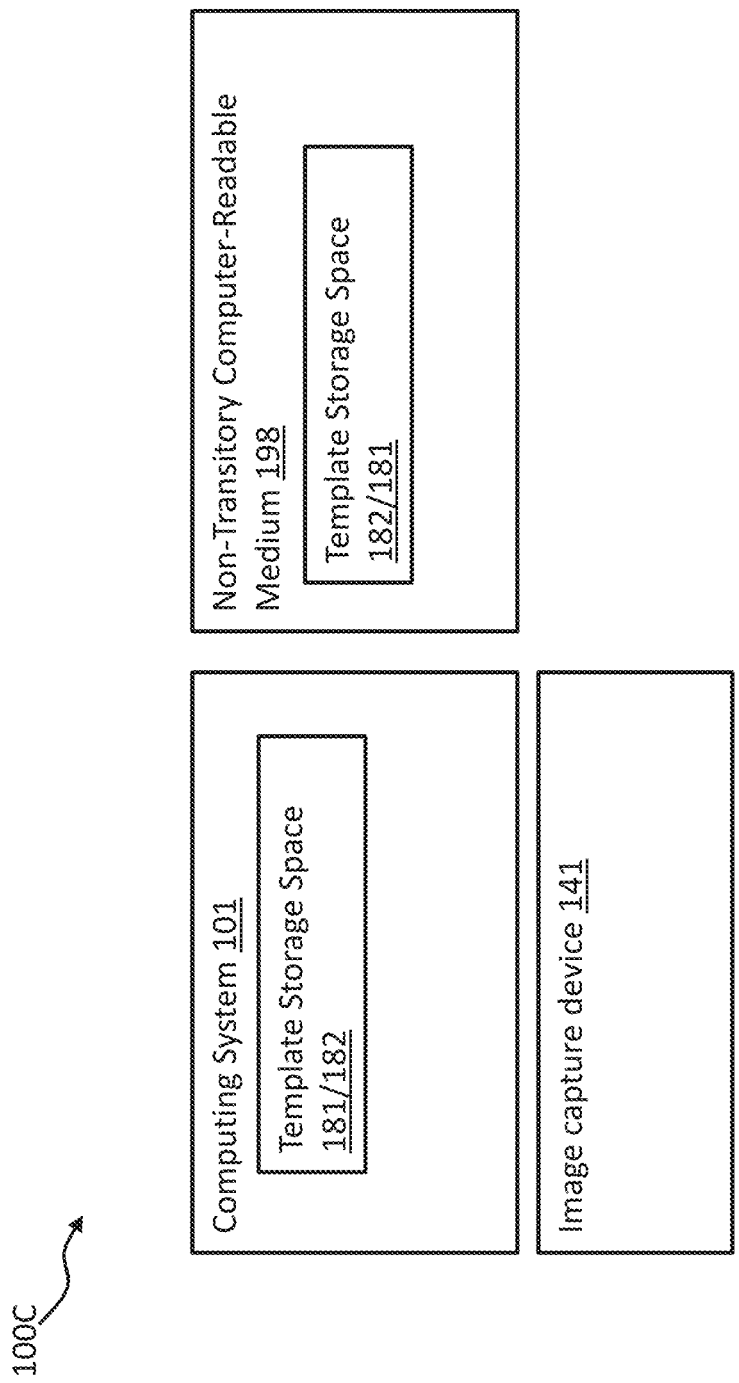
Figure 1E:
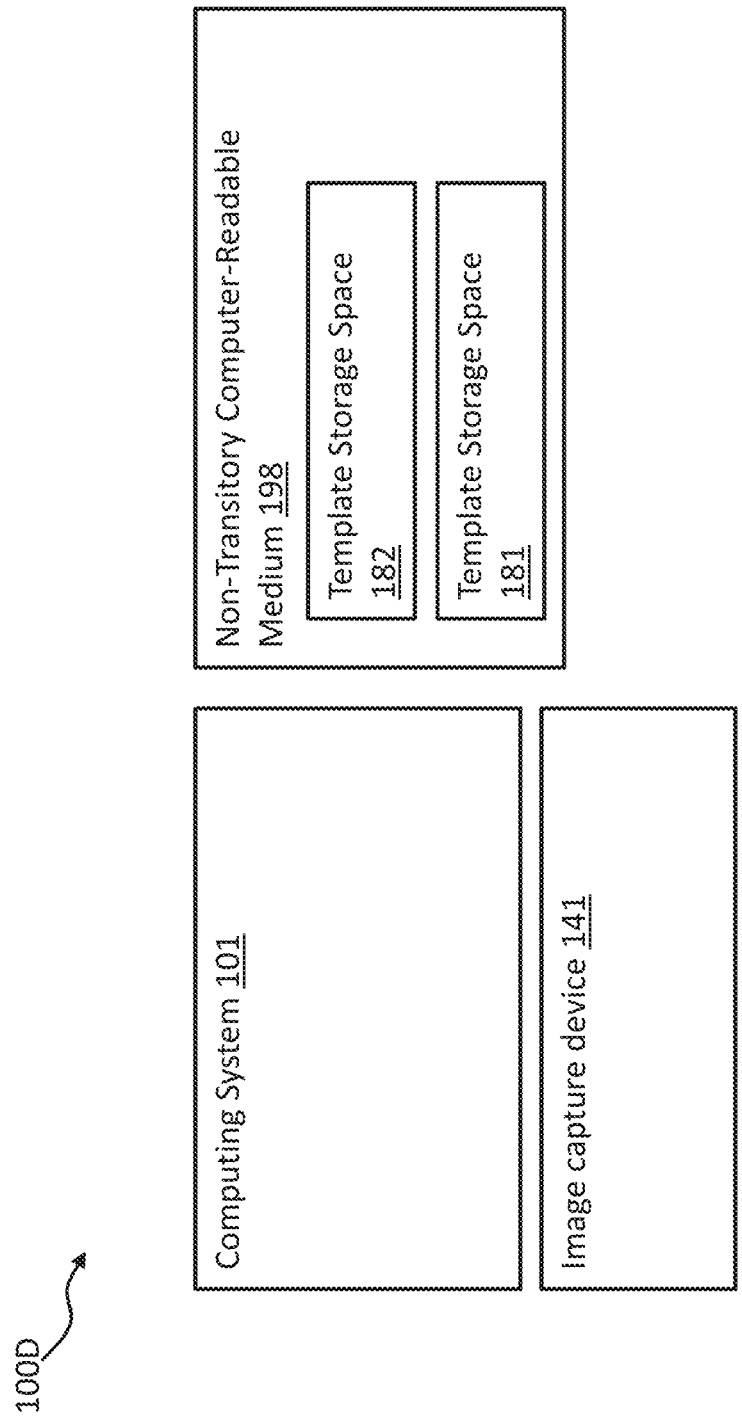

In an embodiment, the first template storage space 181 and/or the second template storage space may be hosted on or otherwise located on the computing system 101. For example, the embodiment of FIG. 1C depicts an implementation in which the computing system 101 hosts or otherwise includes both the first template storage space 181 and the second template storage space 182. More specifically, the two template storage spaces 181, 182 may be hosted or otherwise located on a storage device or other non-transitory computer-readable medium of the computing system 101, as discussed below in more detail with respect to FIG. 2E. Further, FIG. 1D illustrates a system 100C (which may be an embodiment of the system 100/100A) in which one of the first template storage space 181 or the second template storage space 182 is hosted on the computing system 101, and the other of the first template storage space 181 or second template storage space 182 is hosted on a non-transitory computer-readable medium 198 separate from the computing system 101. In an embodiment, both of the first template storage space 181 and the second template storage space 182 may be hosted or otherwise located on the non-transitory computer-readable medium 198, rather than on the computing system 101, as illustrated in FIG. 1E.

In an embodiment, the non-transitory computer-readable medium 198 may include a single storage device, or may include a group of storage devices. The computing system 101 and the non-transitory computer-readable medium 198 may be located at the same premises, or may be located remotely from each other. The non-transitory computer-readable medium 198 may include, but is not limited to, an electronic storage device, a magnetic storage device, an optical storage device, an electromagnetic storage device, a semiconductor storage device, or any suitable combination thereof, for example, such as a computer diskette, a hard disk, a random access memory (RAM), a read-only memory (ROM), an erasable programmable read-only memory (EPROM or Flash memory), a solid state drive, a static random access memory (SRAM), a portable compact disc read-only memory (CD-ROM), a digital versatile disk (DVD), and/or a memory stick. In some cases, the non-transitory computer-readable medium 198 and/or the computing system 101 of FIGS. 1C-1E may provide a database or database management system for accessing templates (if any) in the first template storage space 181 and/or the second template storage space 182.

In an embodiment, the first template storage space 181 may be cleared more often relative to the second template storage space 182. For instance, the first template storage space 181 may act as a cache or other short-term template storage space used to temporarily store a specific template or specific type of templates. As discussed below in more detail, the cache or other short-term template storage space may be used to store templates that have been classified as being textureless (also referred to as textureless templates). In some embodiments, the first template storage space 181 may also be referred to as a textureless template storage space 181 when acting as the cache or other short-term template storage space used to temporarily store the textureless templates. In some cases, the first template storage space 181 may retain its stored templates (if any) while a particular task is being performed, such as a robot task involving de-palletizing a stack of boxes or other containers, and templates in the first template storage space 181 may be cleared after completion of the task. In such an example, the textureless templates which are generated for a particular task are not reused for a subsequent task.

In an embodiment, the second template storage space 182 may act as a long-term template storage space (e.g., a long-term template database). In some cases, the second template storage space 182 may be reserved for a specific template or specific type of templates, such as templates which have been classified as being textured (also referred to as textured templates), as discussed below in more detail. In some embodiments, the second template storage space 182 may also be referred to as a textured template storage space 182 when acting as the long-term template storage space used to store the textured templates. Templates or other content in the second template storage space 182 may be more permanent than templates or other content in the first template storage space 182. For example, the second template storage space 182 may retain its stored templates (if any) across a span of many tasks, including the robot task discussed above. In other words, the textured templates which are generated for a particular task may be reused for a subsequent task, so as to facilitate object recognition for that subsequent task. In an embodiment, using the first template storage space 181 as a short-term template storage space and using the second template storage space 182 as a long-term template storage space may provide a technical advantage of reducing storage resources needed to store templates for object recognition, and/or a technical advantage of improving a speed by which the object recognition is performed, as discussed below in more detail.

In an embodiment, the non-transitory computer-readable medium 198 of FIGS. 1D and 1E may further store an image generated by the image capture device 141, and/or sensed structure information generated by the spatial structure sensing device 142. In such an embodiment, the computing system 101 may receive the image and/or sensed structure information from the non-transitory computer-readable medium 198. In some cases, various components of the system 100/100A/100B/100C/100D of FIGS. 1A-1E may communicate via a network. For instance, FIG. 1F depicts a system 100E, which may be an embodiment of any of system 100/100A/100B/100C/100D, that includes a network 199. More specifically, the computing system 101 may receive an image generated by the image capture device 141 via the network 199. The network 199 may provide an individual network connection or a series of network connections to permit the computing system 101 to receive image data consistent with the embodiments hereof. In an embodiment, the network 199 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel or a satellite band. The wireless links may also include any cellular network standards to communicate among mobile devices, including standards that qualify as 2G, 3G, 4G, or 5G. Wireless standards may use various channel access methods, e.g., FDMA, TDMA, CDMA, or SDMA. Network communications may be conducted via any suitable protocol, including, e.g., HTTP, TCP/IP, UDP, ethernet, ATM, etc.

In an embodiment, the computing system 101 and the image capture device 141 and/or the spatial structure sensing device 142 may communicate via a direct connection rather than a network connection. For instance, the computing system 101 in such an embodiment may be configured to receive an image from the image capture device 141 and/or sensed structure information from the spatial structure sensing device 142 via a dedicated communication interface, such as a RS-232 interface, a universal serial bus (USB) interface, and/or via a local computer bus, such as a peripheral component interconnect (PCI) bus.

In an embodiment, an image which is generated by the image capture device 141 may be used to facilitate control of a robot. For instance, FIG. 1G illustrates a robot operation system 100F (which is an embodiment of system 100/100A/100B/100C/100D/100E) that includes the computing system 101, the image capture device 141, and a robot 161. The image capture device 141 may be configured to generate an image that represents, e.g., an object in a warehouse or other environment, and the robot 161 may be controlled to interact with the object based on the image. For example, the computing system 101 may be configured to receive the image and to perform object recognition and/or object registration based on the image. The object recognition may involve determining, e.g., a size or shape of the object, and whether the size or shape of the object matches an existing template. In this example, the robot 161's interaction with the object may be controlled based on the determined size or shape of the object, and/or based on a matching template (if any).

In an embodiment, the computing system 101 may form or be part of a robot control system (also referred to as a robot controller) that is configured to control movement or other operation of the robot 161. For instance, the computing system 101 in such an embodiment may be configured to perform motion planning for the robot 161 based on an image generated by the image capture device 141, and to generate one or more movement commands (e.g., motor commands) based on the motion planning. The computing system 101 in such an example may output the one or more movement commands to the robot 161 so as to control its movement.

Figure 1H:
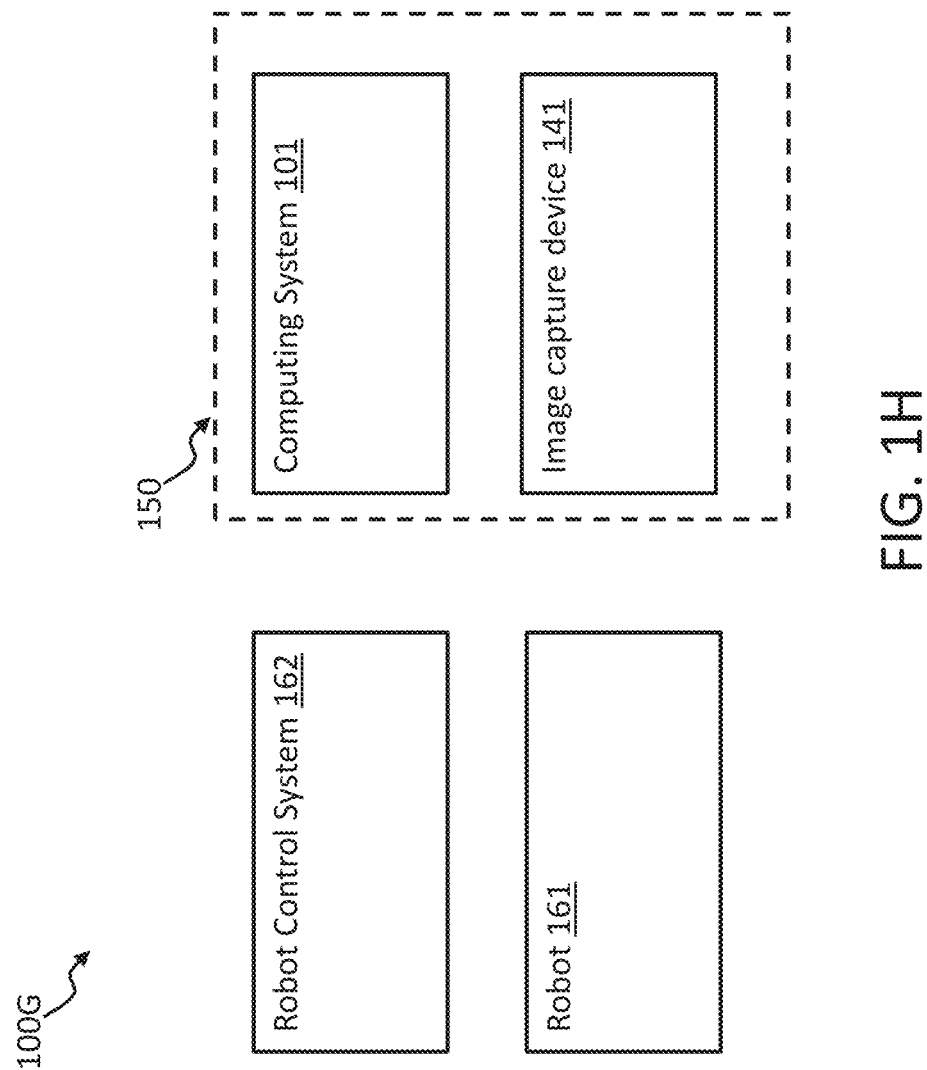

In an embodiment, the computing system 101 may be separate from a robot control system, and may be configured to communicate information to the robot control system so as to allow the robot control system to control the robot. For instance, FIG. 1H depicts a robot operation system 100G (which is an embodiment of any of systems 100 through 100F) that includes the computing system 101 and a robot control system 162 separate from the computing system 101. The computing system 101 and the image capture device 141 in this example may form a vision system 150 that is configured to provide to the robot control system 162 information about an environment of the robot 161, and more specifically about objects in that environment. The computing system 101 may function as a vision controller that is configured to process an image generated by the image capture device 141 to determine the information about the environment of the robot 161. The computing system 101 may be configured to communicate the determined information to the robot control system 162, which may be configured to perform motion planning for the robot 161 based on the information received from the computing system 101.

As stated above, the image capture device 141 of FIGS. 1A through 1H may be configured to generate image data which captures or forms an image that represents one or more objects in an environment of the image capture device 141. More specifically, the image capture device 141 may have a device field of view, and may be configured to generate an image which represents one or more objects in the device field of view. As used herein, image data refers to any type of data (also referred to as information) that describes an appearance of the one or more objects (also referred to as one or more physical objects). In an embodiment, the image capture device 141 may be or may include a camera, such as a camera configured to generate a two-dimensional (2D) image. The 2D image may be, e.g., a grayscale image or a color image.

As further stated above, the image generated by the image capture device 141 may be processed by the computing system 101. In an embodiment, the computing system 101 may include or be configured as a server (e.g., having one or more server blades, processors, etc.), a personal computer (e.g., a desktop computer, a laptop computer, etc.), a smartphone, a tablet computing device, and/or other any other computing system. In an embodiment, any or all of the functionality of the computing system 101 may be performed as part of a cloud computing platform. The computing system 101 may be a single computing device (e.g., a desktop computer or server), or may include multiple computing devices.

Figure 2A:
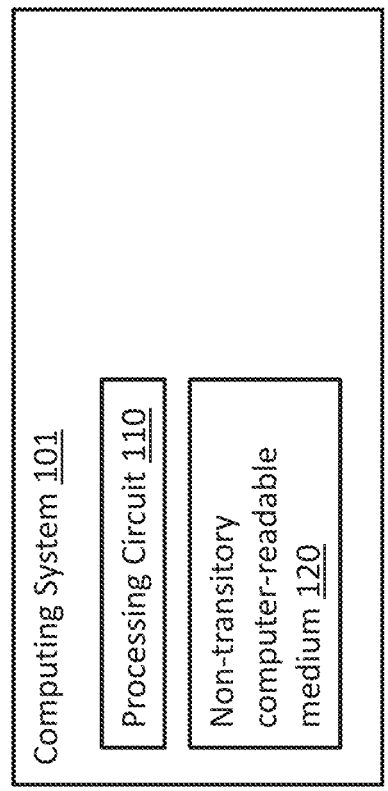
FIGS. 2A-2F provide block diagrams that illustrate a computing system configured to perform object recognition or object registration based on image classification, according to embodiments hereof.

FIG. 2A provides a block diagram that illustrates an embodiment of the computing system 101. The computing system 101 includes at least one processing circuit 110 and a non-transitory computer-readable medium (or media) 120. In an embodiment, the processing circuit 110 includes one or more processors, one or more processing cores, a programmable logic controller ("PLC"), an application specific integrated circuit ("ASIC"), a programmable gate array ("PGA"), a field programmable gate array ("FPGA"), any combination thereof, or any other processing circuit.

In an embodiment, the non-transitory computer-readable medium 120 may be a storage device, such as an electronic storage device, a magnetic storage device, an optical storage device, an electromagnetic storage device, a semiconductor storage device, or any suitable combination thereof, for example, such as a computer diskette, a hard disk, a solid state drive (SSD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, any combination thereof, or any other storage device. In some instances, the non-transitory computer-readable medium 120 may include multiple storage devices. In certain cases, the non-transitory computer-readable medium 120 is configured to store image data received from the image capture device 141, and/or sensed structure information received from the spatial structure sensing device 142. In certain cases, the non-transitory computer-readable medium 120 further stores computer readable program instructions that, when executed by the processing circuit 110, causes the processing circuit 110 to perform one or more methods described herein, such as a method described with respect to FIG. 3.

Figure 2B:
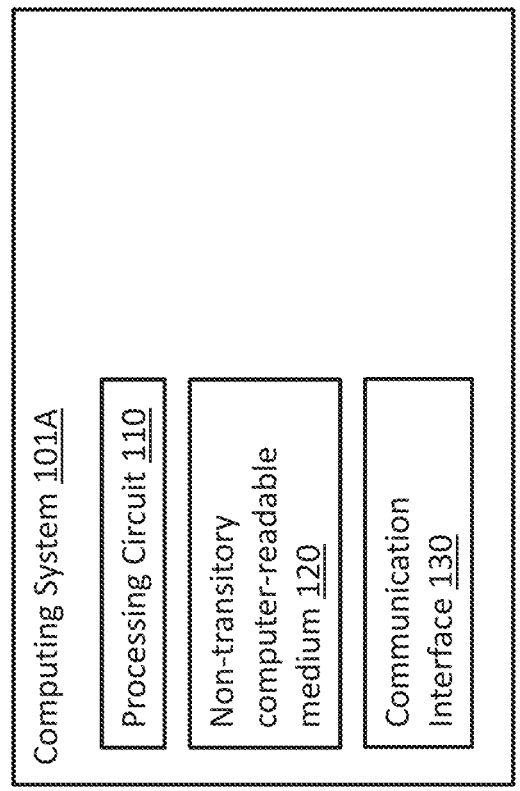

FIG. 2B depicts a computing system 101A that is an embodiment of the computing system 101 and includes a communication interface 130. The communication interface 130 may be configured to, e.g., receive an image, or more generally image data, from the image capture device 141, such as via the non-transitory computer-readable medium 198 of FIG. 1D or 1E, the network 199 of FIG. 1F, or via a more direct connection. In an embodiment, the communication interface 130 may be configured to communicate with the robot 161 of FIG. 1G or the robot control system 162 of FIG. 1H. The communication interface 130 may include, e.g., a communication circuit configured to perform communication over a wired or wireless protocol. As an example, the communication circuit may include a RS-232 port controller, a USB controller, an Ethernet controller, a Bluetooth® controller, a PCI bus controller, any other communication circuit, or a combination thereof.

Figure 2C:
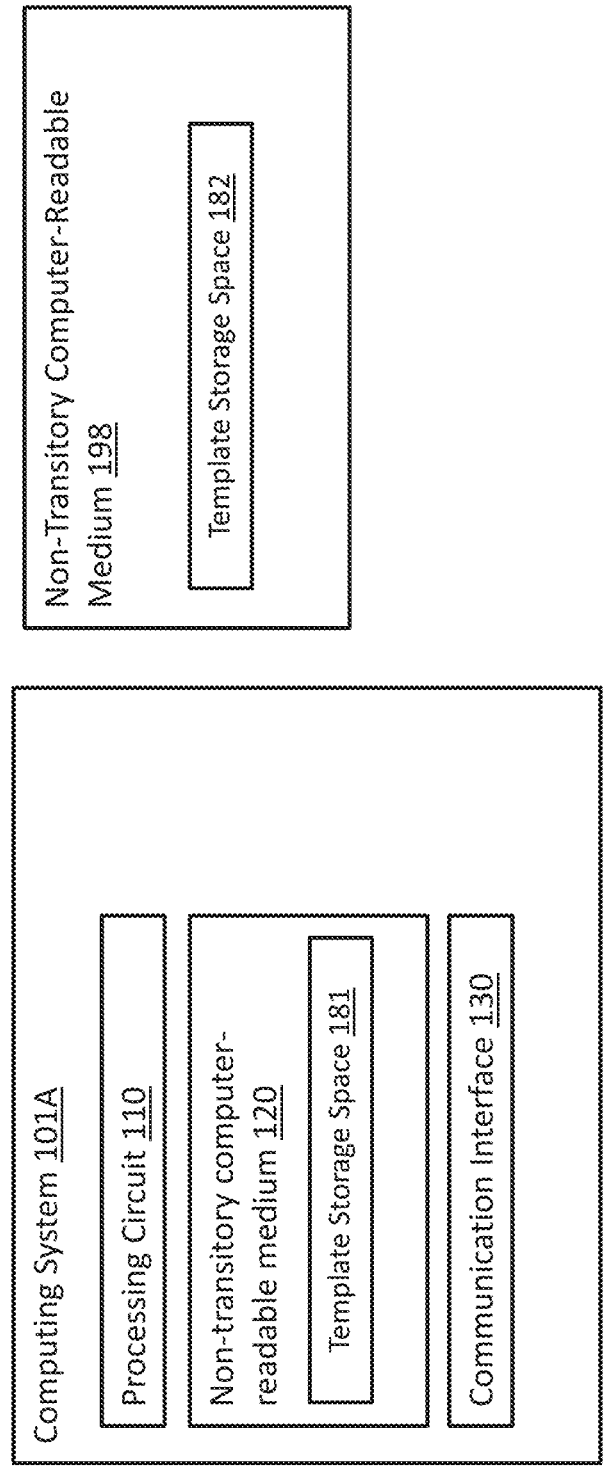
Figure 2D:
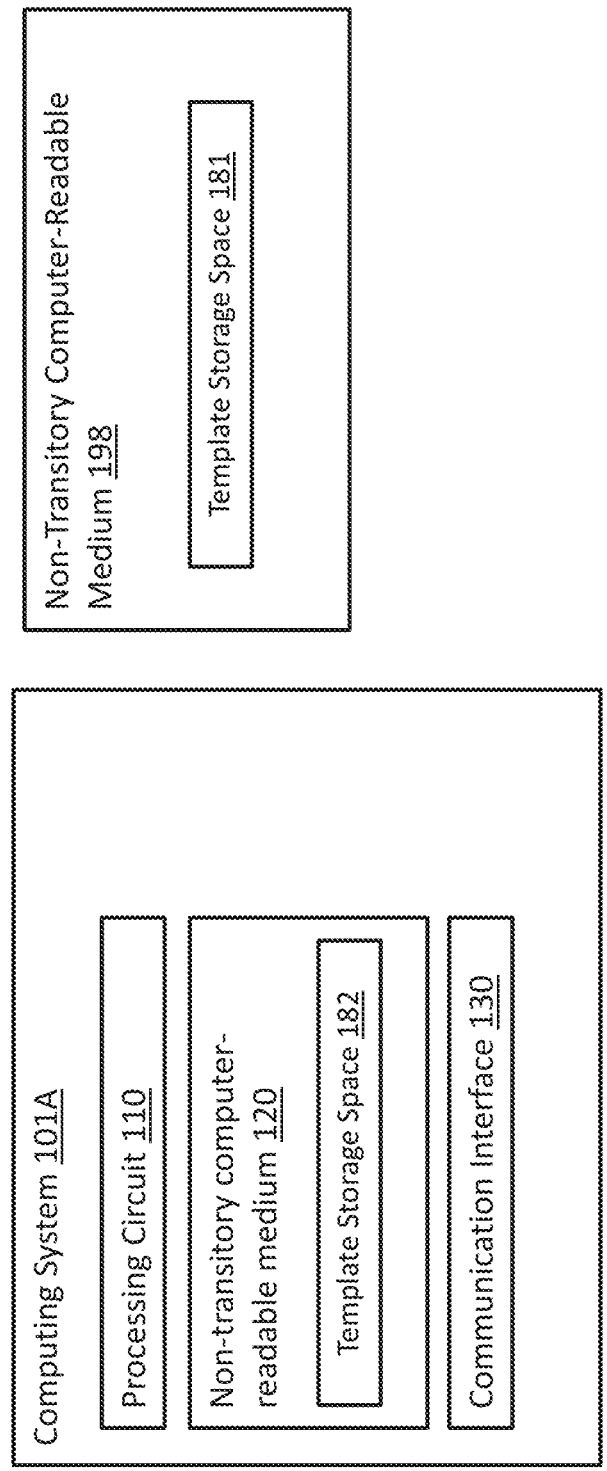
Figure 2E:
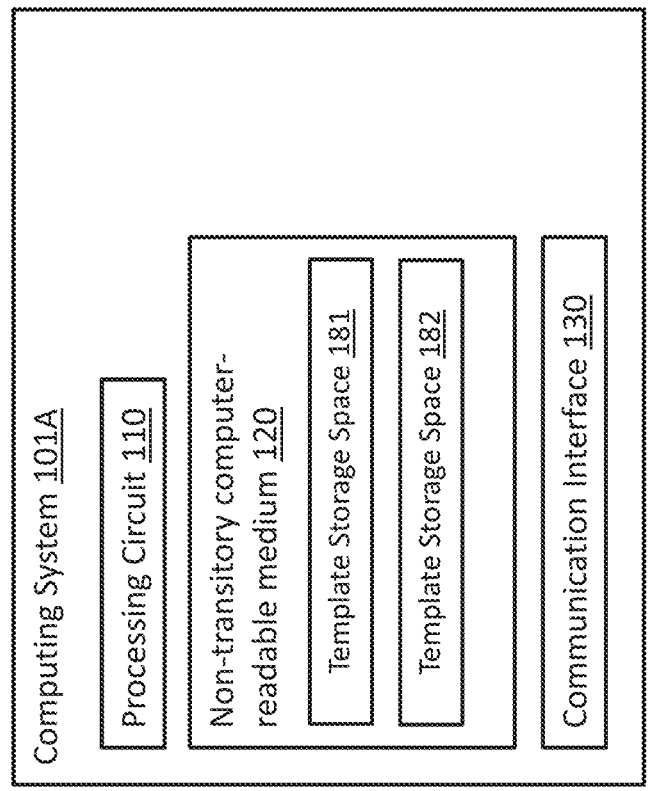

In an embodiment, if the first template storage space 181 and/or the second template storage space 182 discussed above are hosted or otherwise located on the non-transitory computer-readable medium 198 of FIGS. 1E and 1D, the communication interface 130 may be configured to communicate with the non-transitory computer-readable medium 198 (e.g., directly or via a network). The communication may be performed to receive a template from the template storage space 181/182, or to send a template to the template storage space 181/182 for storage therein. In some instances, as stated above, the computing system 101 may host or otherwise include the first template storage space 181 and/or the second template storage space 182. For instance, FIGS. 2C, 2D, and 2E depict embodiments in which the first template storage space 181 and/or the second template storage space 182 are located on the non-transitory computer-readable medium 120 of the computing system 101.

Figure 2F:
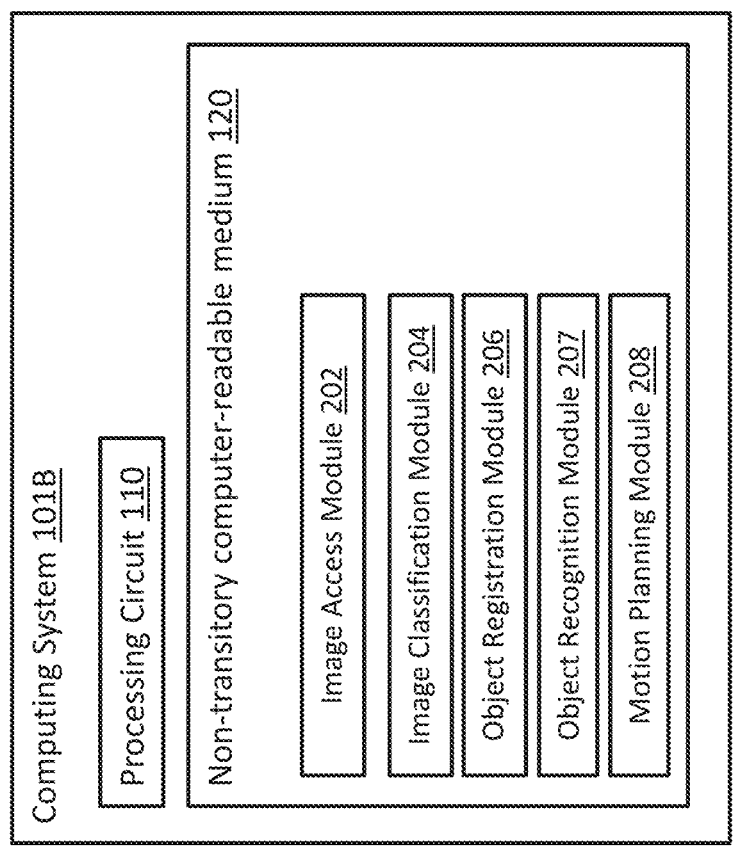

In an embodiment, the processing circuit 110 may be programmed by one or more computer-readable program instructions stored on the non-transitory computer-readable medium 120. For example, FIG. 2F illustrates a computing system 101B, which may be an embodiment of the computing system 101/101A, in which the processing circuit 110 is programmed by or is configured to execute an image access module 202, an image classification module 204, an object registration module 206, an object recognition module 207, and a motion planning module 208. It will be understood that the functionality of the various modules as discussed herein is representative and not limiting.

In an embodiment, the image access module 202 may be a software protocol operating on the computing system 101B, and may be configured to obtain (e.g., receive) an image, or more generally image data. For example, the image access module 202 may be configured to access image data stored in non-transitory computer-readable medium 120 or 198, or via the network 199 and/or the communication interface 130 of FIG. 2B. In some cases, the image access module 202 may be configured to receive the image data directly or indirectly from the image capture device 141. The image data may be for representing one or more objects in a field of view of the image capture device 141. In an embodiment, the image classification module 204 may be configured to classify an image or an image portion as being textured or textureless, as discussed below in more detail, wherein the image may be represented by the image data obtained by the image access module 202.

In an embodiment, the object registration module 206 may be configured to determine a visual characteristic, a physical characteristic, and/or any other characteristic of an object, and to generate a template which describes the characteristic(s) of the object. In some cases, the object recognition module 207 may be configured to perform object recognition based on, e.g., an appearance of the object or other visual characteristic of the object, to determine if a template corresponding to that object already exists. More specifically, the object recognition may be based on one or more templates, such as the templates in the first template storage space 181 or in the second template storage space 182 of FIGS. 2C-2E. The object recognition may involve, e.g., determining whether the appearance of the object matches any template of the one or more templates. In some cases, if the object recognition module 207 determines that there is no such match, the appearance of the object may be used by the object registration module 206 to create a new template, as part of an object registration process. In an embodiment, the motion planning module 208 may be configured to perform motion planning for, e.g., controlling robot interaction with an object based on the classification performed by the image classification module 204 and/or based on a result of the object recognition module 207, as discussed below in more detail.

In various embodiments, the terms "software protocol," "software instructions," "computer instructions," "computer-readable instructions," and "computer-readable program instructions" are used to describe software instructions or computer code configured to carry out various tasks and operations. As used herein, the term "module" refers broadly to a collection of software instructions or code configured to cause the processing circuit 110 to perform one or more functional tasks. For convenience, the various modules, managers, computer instructions, and software protocols will be described as performing various operations or tasks, when, in fact, the modules, computer instructions, and software protocols program hardware processors to perform the operations and tasks. Although described in various places as "software" it is understood that the functionality performed by the "modules," "software protocols," and "computer instructions," may more generally be implemented as firmware, software, hardware, or any combination thereof. Furthermore, embodiments herein are described in terms of method steps, functional steps, and other types of occurrences. In an embodiment, these actions occur according to computer instructions or software protocols executed by processing circuit 110 of the computing system 101.

Figure 3:
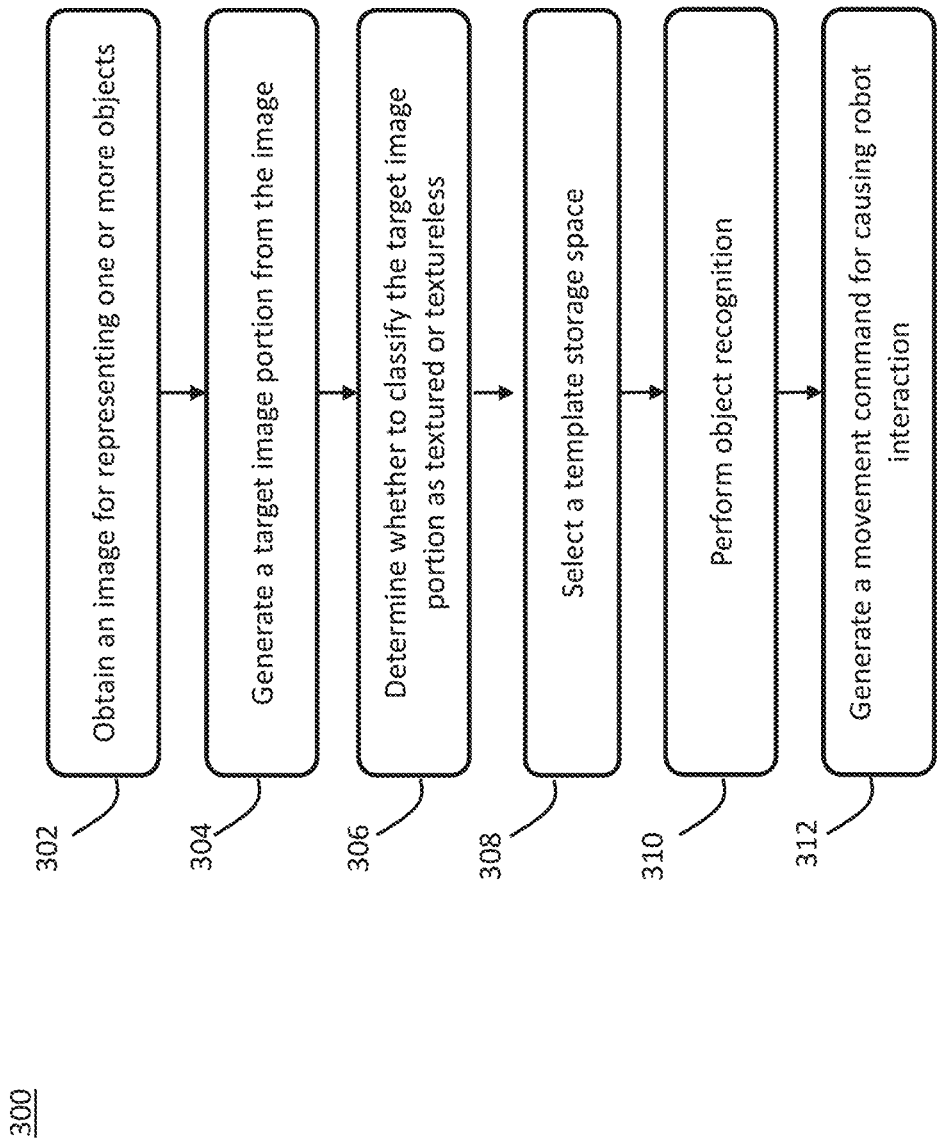
FIG. 3 provides a flow diagram that illustrates a method of performing object recognition based on image classification, according to an embodiment hereof.

FIG. 3 is a flow chart that illustrates example operations for a method 300 for performing object recognition and/or object registration. In one example, method 300 may facilitate or may be part of a de-palletization task in which a stack of objects (e.g., boxes or other packages on a pallet) are unloaded. In some cases, the object recognition may facilitate determining a structure for an object (also referred to as an object structure) in the stack, which may assist the de-palletization task. In some cases, the object recognition and/or object registration may facilitate tracking which object or types of object have been unloaded or otherwise processed by a robot operation system (e.g., 100F of FIG. 1G), which may assist an inventory management task or some other task. In an embodiment, the method 300 may be performed by the computing system 101 of FIGS. 1A through 2F, such as by the processing circuit 110. For example, the non-transitory computer-readable medium 120 of the computing system 101 may store a plurality of instructions (e.g., computer program instructions), and the processing circuit 100 may perform the method 300 by executing the instructions.

Figure 4A:
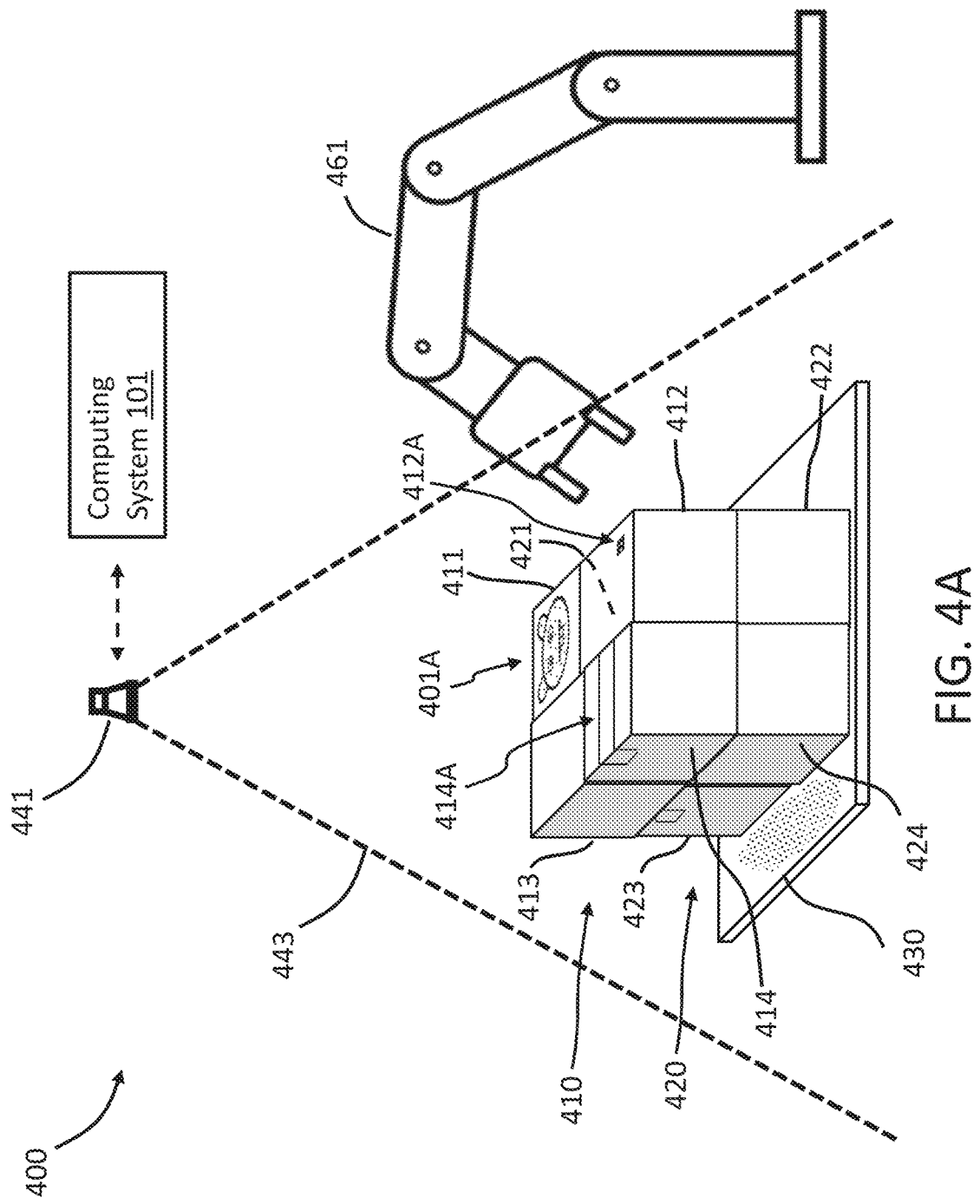
FIGS. 4A-4C illustrate example environments and systems in which object recognition or object registration may be performed, according to embodiments hereof.
Figure 4B:
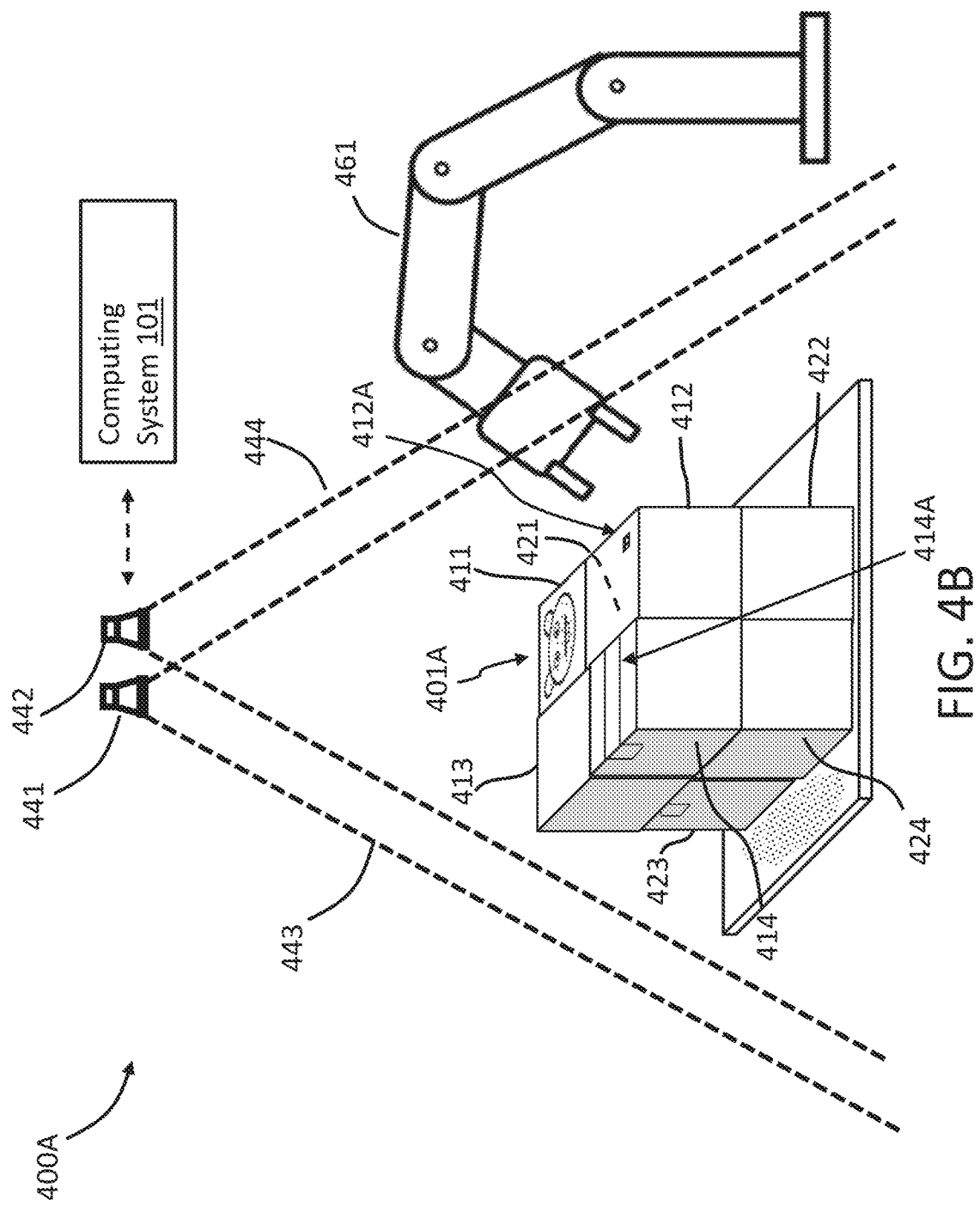
Figure 4C:
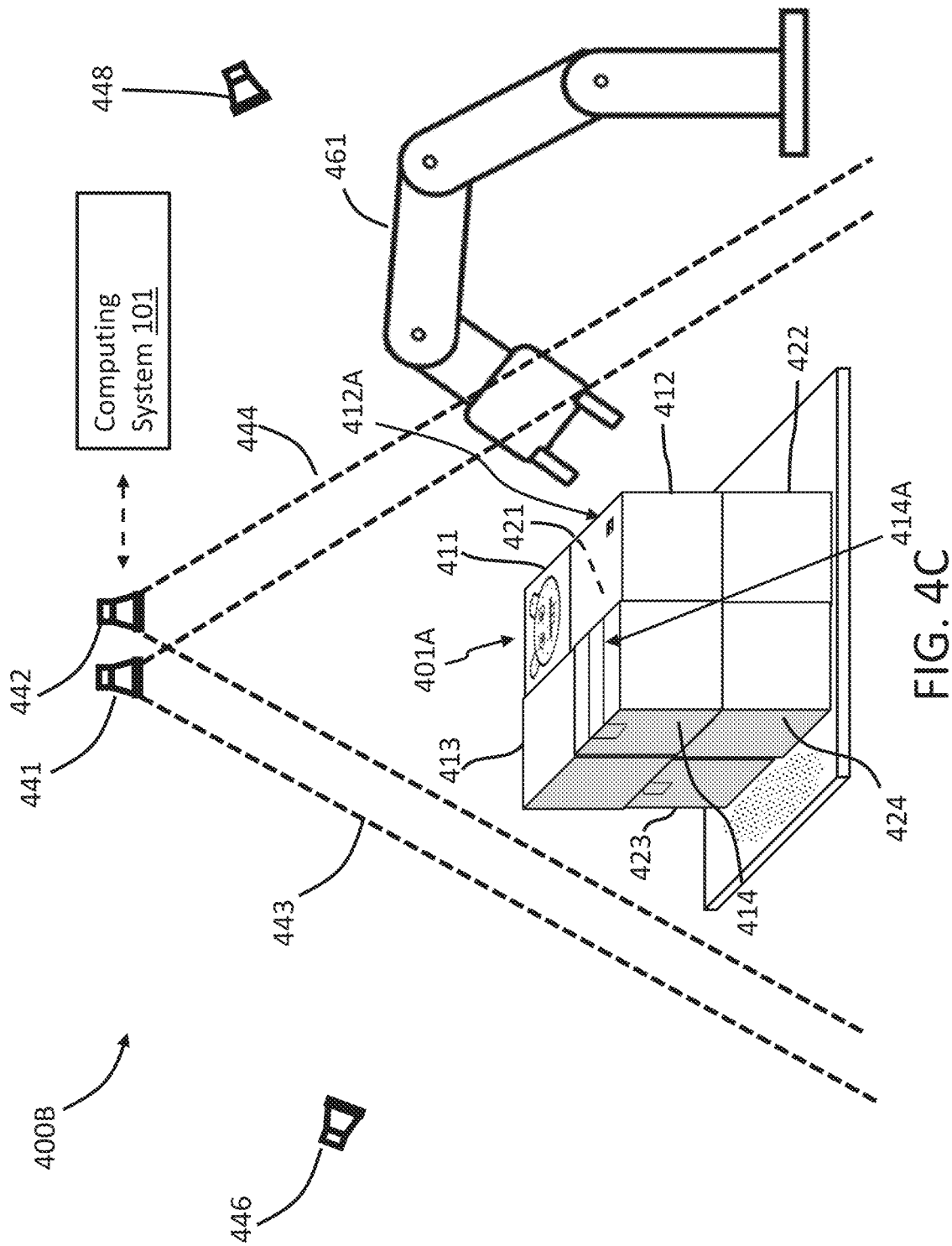

FIGS. 4A-4C illustrate an example environment in which the method 300 may be performed. More particularly, FIG. 4A depicts a system 400 (which may be an embodiment of any one of systems 100 through 100G) that includes the computing system 101, an image capture device 441 (which may be an embodiment of the image capture device 141), and a robot 461 (which may be an embodiment of the robot 161 of FIG. 1G or 1H). FIG. 4B depicts a system 400A, which includes components of system 400, and further includes a spatial structure sensing device 442 (which may be an embodiment of the spatial structure sensing device 142). Additionally, FIG. 4C depicts a system 400B which includes components of system 400A, and further includes one or more additional image capture devices or spatial structure sensing devices, such as the spatial structure sensing devices 446, 448.

As depicted in FIGS. 4A-4C, the system 400/400A/400B may be used to perform object recognition and/or object registration for one or more objects, such as the objects 411-414 and 421-424, and/or to control the robot 461 to interact with the one or more objects. In some scenarios, the one or more objects (e.g., boxes or other containers) may form a stack disposed on a platform, such as the pallet 430. The robot interaction may involve, e.g., picking up the one or more objects and moving them to a desired destination, such as from the pallet 430 to a conveyor belt. The stack may have multiple layers, such as a first layer 410 and a second layer 420 illustrated in FIGS. 4A-4C. The first layer 410 may be formed by objects 411-414, while the second layer 420 may be formed by objects 421-424. In some instances, a visual marking may appear on one or more surfaces of an object. For example, FIGS. 4A-4C depict a picture 401A printed or otherwise disposed on a surface (e.g., top surface) of the object 411, and a logo 412A or other visual marking printed or otherwise disposed on a surface of the object 412. The visual marking may form at least part of a visual design of the object 411/412. In some cases, if the object 411/412 is a box for holding merchandise, the visual design may indicate a brand name of the merchandise, a manufacturer or distributor of the merchandise, or may be an illustration or drawing of the merchandise. In some situations, a physical item, such as a strip of tape 414A, may be disposed on a surface of an object, such as on a top surface of the object 414. In some situations, at least one of the objects may have no visual marking on one or more surfaces. For example, a top surface of the object 413 may be blank.

In an embodiment, the objects 411-414, 421-424 may include objects which have the same object design. As an example, object 411 may have the same object design as object 424 (which is illustrated in more detail in FIG. 8A), while object 412 may have the same object design as object 422 (also illustrated in FIG. 8A). More particularly, as stated above, the object design may include a visual design and/or a physical design. In an embodiment, the physical design of an object may refer to its physical structure, such as the object's size or shape. In this example, the object 411 may have the same visual design as the object 424, while the object 412 may have the same visual design as the object 422. If the objects 411-414, 421-424 are boxes or other containers for holding merchandise, the common visual design between objects 411 and 424, and between objects 412 and 422 may indicate a likelihood that these objects are holding the same merchandise or model of merchandise, and/or that they may be from the same manufacturer or distributor. In some cases, the common visual design between the objects 411 and 424 (or between objects 412 and 422) may indicate a likelihood that these objects belong to the same object design, and that they therefore also have a common physical design, such as a common object size and/or common object shape.

In an embodiment, object registration may be performed to generate templates which describe various object designs that have been encountered by the system 100/400. More specifically, information that is sensed by the image capture device 441 or sensed by the spatial structure sensing device 442 may be used to generate a template which describes an object design of an object, such as one or more of objects 411-414, 421-424, as discussed below in more detail.

As stated above, the template may in some cases include a visual feature description which describes an appearance of an object or group of objects, or more specifically a visual marking (if any) that appears on a surface of each of the group of objects. The visual marking, such as a picture, pattern, or logo, may form a visual design that is common to the group of objects, and may be represented in an image or other information generated by the image capture device 441. In some instances, the template may store or otherwise include the visual marking itself, such as the picture, pattern, or logo which may appear in the image generated by the image capture device 441. In some instances, the template may store information which encodes the picture, pattern, logo, or other visual marking. For example, the template may store descriptors that are generated to describe the visual marking, or more specifically to describe specific features formed by the visual marking (e.g., picture or logo).

In some cases, the template may include an object structure description, which may a describe an object structure (also referred to as physical structure) of an object or group of objects. For example, the object structure description may describe an object size and/or an object shape that form a physical design which is common to the group of objects. In some cases, the object size may describe object dimensions associated with the group of objects, or more generally associated with the physical design. In some cases, the object shape may describe a physical profile formed by each of the group of objects, or more generally a physical profile associated a physical design associated with the group of objects. The physical profile of an object may refer to, e.g., a contour (e.g., 3D contour) of the object, which may be defined by a shape of one or more surfaces of the object, and by how the surfaces are arranged relative to each other. For instance, the physical profile of a square box may be defined by a physical design having flat surfaces that are orthogonal to each other. In some cases, the physical profile may include any physical feature formed on one or more surfaces of the object. As an example, if the object is a container, the physical feature may include a container lip or container handle (if any) formed on one or more surfaces of the container. In this example, the object size and/or object shape may be described by the sensed structure information generated by the spatial structure sensing device 442 (and/or by the spatial structure sensing devices 446, 448 of FIG. 4C). In some cases, the object structure description may include the sensed structure information itself, such as a point cloud. In some cases, the object structure description may include information derived from the sensed structure information, such as information describing the object size (e.g., a length and width of a top surface, or an aspect ratio between the length and width), a CAD file describing the object structure, or some other information.

Returning to FIG. 3, the method 300 may in an embodiment begin with or otherwise include a step 302, which the computing system 101 may be configured to perform when one or more objects, such as objects 411-414, 421-424 in FIGS. 4A-4C, are in the field of view of the image capture device, such as the field of view 443 of the image capture device 441. In some cases, if the method 300 involves the use of a spatial structure sensing device (e.g., 442), the one or more objects (e.g., 411-414, 421-424) may further be in a field of view (e.g., 444) of the spatial structure sensing device (e.g., 442). During step 302, the processing circuit 110 of the computing system 101 may obtain or otherwise receive an image for representing the one or more objects (e.g., 411-414 and/or 421-424), wherein the image may be generated by the image capture device (e.g., 441). In some cases, operation 302 may be performed by the image access module 202 of FIG. 2F.

Figure 5A:
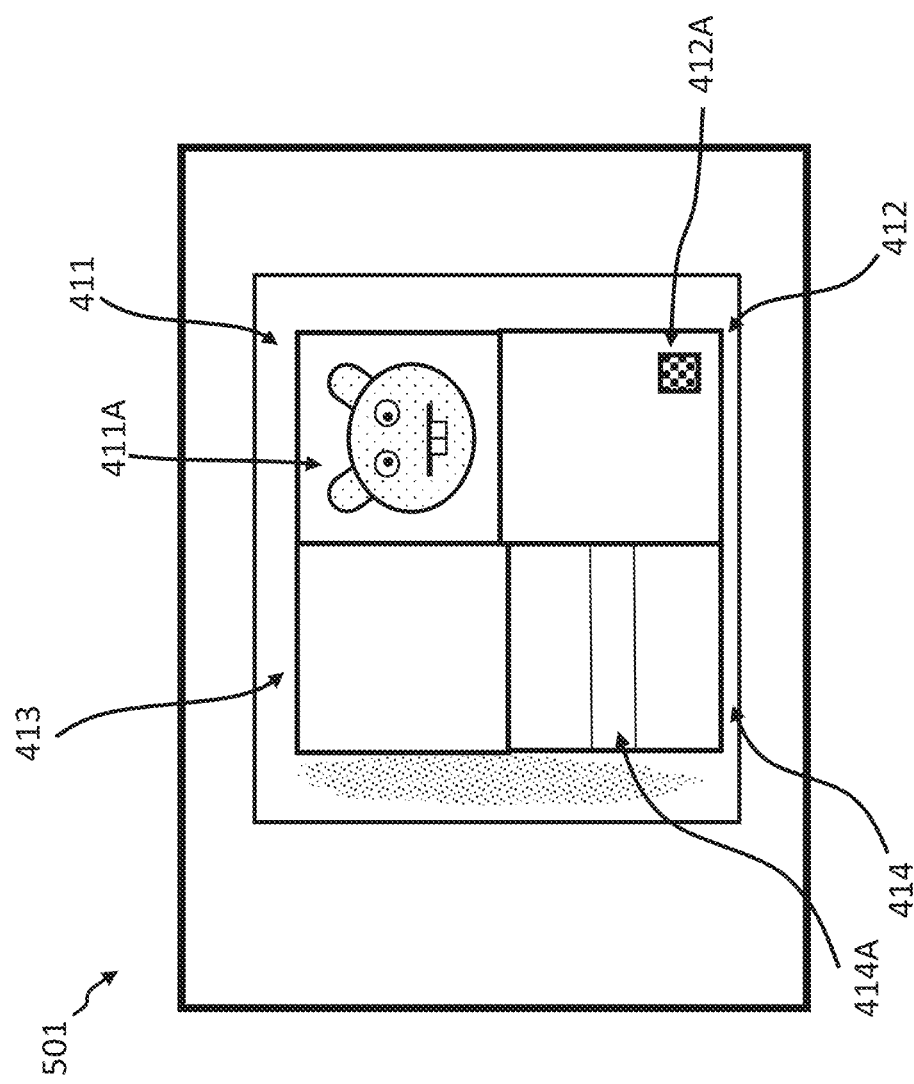
FIGS. 5A-5E illustrate aspects of performing object recognition or object registration based on classification for a portion of an image, in accordance with an embodiment hereof.

As an example of step 302, FIG. 5A depicts an obtained image 501 that represents or is otherwise associated with at least the objects 411-414 of the stack of objects 411-414, 421-424 of FIGS. 4A-4C. As stated above, the objects 411-414 may in one example be boxes or other containers on a pallet 430. In this example, the objects 411-414 that are represented by the image 501 may belong to one layer of the pallet, such as the layer 410. The image 501 may be generated by the image capture device 441, which in this example may be positioned directly above the objects 411-414, 421-424. More specifically, the image 501 may represent an appearance of respective top surfaces of the objects 411-414, or more specifically of a non-occluded portion(s) of the top surfaces. In other words, the image 501 in this example may represent a top perspective view that captures top surfaces of the objects 411-414. In some cases, the image 501 may more specifically represent an appearance of visual markings (if any) printed on or otherwise disposed on one or more surfaces of the objects 411-414. The visual markings may include, e.g., the picture 411A printed on a surface of the object 411, and the logo 412A or other pattern printed on a surface of the object 412. In some cases, the image 501 may represent an appearance of a physical item disposed on the one or more surfaces, such as the strip of tape 414A disposed on a surface of the object 414. In an embodiment, the image 501 may be or include a two-dimensional (2D) array of pixels, which may have respective pixel values (also referred to as pixel intensity values) associated with intensity of a signal being sensed by the image capture device 441, such as an intensity of light reflecting off respective surfaces (e.g., top surfaces) of the objects 411-414. In some cases, the image 501 may be a grayscale image. In some cases, the image 501 may be a color image.

In an embodiment, the received image (e.g., 501) may be obtained by the computing system 101 from the image capture device (e.g., 441). In an embodiment, the received image (e.g., 501) may have been stored on a non-transitory computer-readable medium (e.g., 120 or 198 of FIGS. 2C-2E), and obtaining the image in step 302 may involve retrieving (or, more generally, receiving) the image (e.g., 501) from the non-transitory computer-readable medium (e.g., 120 or 198) or from any other source. In some situations, the image (e.g., 501) may have been received by the computing system 101 from the image capture device (e.g., 441), such as via the communication interface 130 of FIG. 2B, and may have been stored in the non-transitory computer-readable medium (e.g., 120) of the computing system 101, which may provide a storage space for the image (e.g., 501). For instance, the image (e.g., 501) may be received from the image capture device (e.g., 441 of FIG. 4A/4B) and may be stored in the non-transitory computer-readable medium (e.g., 120). The image (e.g., 501) may then be obtained from the non-transitory computer-readable medium (e.g., 120) by the processing circuit 110 of the computing system 101 in step 302.

In some situations, the received image (e.g., 501) may be stored in the non-transitory computer-readable medium (e.g., 120) of the computing system 101, and may have been generated beforehand by the processing circuit 110 of the computing system 101 based on information received from the image capture device (e.g., 441). For instance, the processing circuit 110 may be configured to generate the image (e.g., 501) based on raw camera data received from the image capture device (e.g., 441) and may be configured to store the generated image in the non-transitory computer-readable medium (e.g., 120) of the computing system 101. The image may then be received by the processing circuit 110 in step 302 (e.g., by retrieving the image from the non-transitory computer-readable medium 120). As discussed below in more detail, the computing system 101 may be configured to determine whether it recognizes an object (e.g., 411/412/413/414) represented in the image (e.g., 501), such as by determining whether an appearance of the object matches existing templates of various object designs, and may be configured to generate a new template based on the appearance of the object and/or a physical structure of the object if the computing system 101 does not recognize the object. Generating the new template may be part of an object registration process in which the computing system 101 determines and stores information that describes newly encountered objects.

In an embodiment, method 300 may include a step 304 in which the processing circuit 110 of the computing system 101 generates a target image portion from the image (e.g., 501), wherein the target image portion may be a portion of the image associated with an object (e.g., 411 of FIGS. 4A-4C) of the one or more objects represented by the image (e.g., 501). For example, the target image portion may be a portion of the image (also referred to as an image portion) that represents the object (e.g., 411). In some instances, step 304 may also be performed by the image access module 202.

Figure 5B:
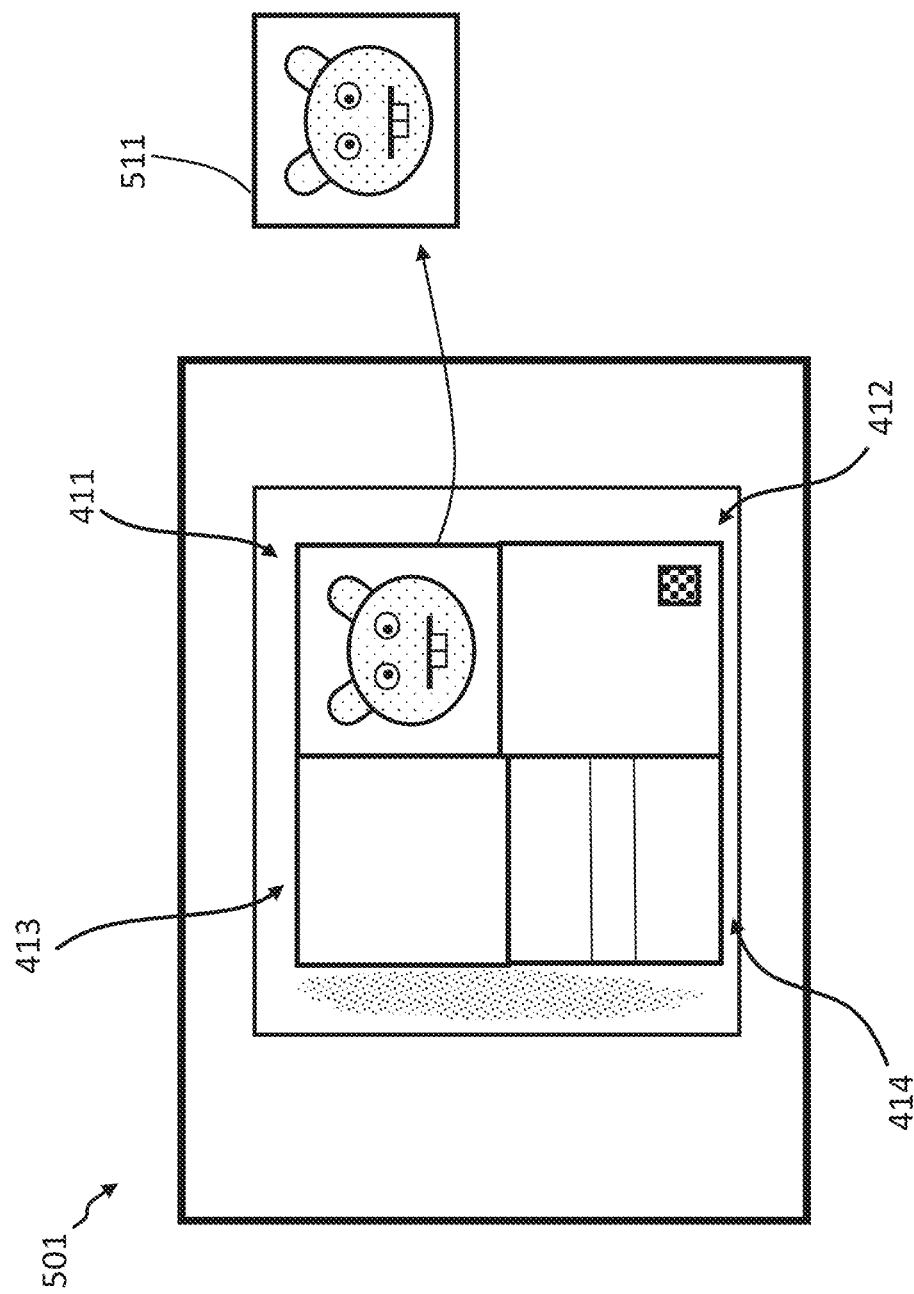

In some cases, step 304 may involve extracting the target image portion from the image obtained in step 302. For instance, FIG. 5B depicts an example in which a target image portion 511, which represents the object 411, is extracted from the image 501. In some cases, step 304 may be performed in a context in which the image that is obtained in step 302 represents multiple objects, such as multiple boxes which form a layer in a stack of boxes. For example, an entirety of the received image 501 in FIGS. 5A and 5B may represent multiple objects, namely objects 411-414. In this example, each of the objects 411-414 may be represented by a specific portion of the image 501. In some cases, the object may be an individual object (e.g., 411) identified by the computing system 101, and may be a target for performing object recognition or object registration, and/or a target for robot interaction (e.g., being unloaded by the robot 161 from a pallet). Thus, the object may also be referred to as a target object. In such cases, the image portion which represents the target object may be referred to as a target image portion. In some cases, the target image portion (e.g., 511) may be a region of pixels of the received image (e.g., 501), such as a rectangular region (e.g., a square region) or a region having any other shape. As stated above, FIG. 5B depicts a target image portion 511 that represents the object 411. In some embodiments, the target image portion 511 can represent an object surface (e.g., a top surface of the target object 411) that is facing the image capture device (e.g., 441 of FIGS. 4B-4C) and/or facing the spatial structure sensing device (e.g., 442 of FIG. 4B-4C), or can represent a portion of that surface. In such embodiments, the target image portion 511 may represent a particular view, such as a top view of the object 411. As discussed below in more detail, FIG. 6A further depicts target image portions 512, 513, and 514 that represent the objects 412, 413, and 414, respectively.

In an embodiment, the target image portion (e.g., 511) may include one or more visual details, such as a line, a corner, a pattern, or a combination thereof. The one or more visual details in the target image portion (e.g., 511) may represent a visual making (if any) that is printed or otherwise disposed on an object (e.g., 411) represented by the target image portion. In an embodiment, the target image portion (e.g., 513) may have few or no visual details, and may appear substantially blank or uniform. In some situations, such a target image portion may represent an object which has no visual making or few visual markings on its surface.

In an embodiment, if step 304 involves extracting the target image portion (e.g., 511) representing an object (e.g., 411) from the received image (e.g., 501), the extraction may be based on identifying locations within the image (e.g., 501) at which edges of the object (e.g., 411) appear, and extracting a region of the image (e.g., 501) bounded by the identified locations, wherein the locations may also be referred to as image locations. In some cases, if the one or more objects (e.g., 411-414) represented by the image (e.g., 501) are also in a field of view of a spatial structure sensing device (e.g., 442 of FIG. 4B), the computing system 101 may be configured to receive spatial structure information generated by the spatial structure sensing device (e.g., 442), and to extract the target image portion (e.g., 511) with assistance from the spatial structure information. For instance, the spatial structure information may include depth information, and the computing system 101 may be configured to determine locations of an edge(s) of the object (e.g., 411), also referred to as edge locations, based on the depth information. As an example, the edge locations may be determined by detecting locations at which there is a sharp change or a discontinuity in depth. The computing system 101 in this example may be configured to map these edge locations to image locations within the image (e.g., 501), and to extract a region of the image bounded by the image locations, wherein the extracted region may be the target image portion (e.g., 501). In some cases, image locations may be, e.g., 2D pixel coordinates, while the edge locations may be 3D coordinates. The computing system 101 may be configured to determine the 2D coordinates based on the 3D coordinates. Such a determination is discussed in more detail in U.S. application Ser. No. 16/791,024, entitled "METHOD AND COMPUTING SYSTEM FOR PROCESSING CANDIDATE EDGES," the entire content of which is incorporated herein by reference.

As stated above, the image received in step 302 (e.g., image 501) may in some cases represent multiple objects. In other cases, the image that is received in step 302 may represent only one object (e.g., only one box). For example, before the image is received by the computing system 101, it may have been processed (e.g., cropped) by the image capture device (e.g., 441) or by another device so as to represent only a particular object (e.g., object 411), and to remove any image portion representing any other object in the field of view (e.g., 443) of the image capture device (e.g., 441). In such an example, the image received in step 302 may represent only that particular object (e.g., object 411), and the target image portion that is extracted in step 304 may be same or substantially the same as the image itself.

In an embodiment, the method 300 of FIG. 3 further includes an operation 306, in which the processing circuit 110 of the computing system 101 determines whether to classify the target image portion (e.g., 511) as textured or textureless. Such a classification may refer to, e.g., whether the target image portion has at least a threshold level of visual texture, or whether the target image portion lacks a threshold level of visual texture, or has no visual texture, such as by being substantially blank or uniform in appearance. As an example, the target image portion 511 of FIG. 5B may be classified as being textured, while the target image portions 512-514 of FIG. 6A may be classified as being textureless. As discussed below in more detail, the target image portion may be used for object recognition and/or object registration. The classification in step 306 may be relevant to the object recognition, because the classification may indicate how much visual texture (if any) is present in the target image portion (e.g., 511), wherein the visual texture may facilitate an object recognition operation that is based at least in part on visual appearance of an object. Thus, the classification in step 306 may influence how the object recognition is performed. As also discussed below, the classification may influence how the object registration is performed, such as by influencing where templates are stored. In some instances, step 306 may be performed by the image classification module 204.

In an embodiment, classifying an image or image portion as being textured or textureless may employ one or more techniques discussed in U.S. patent application Ser. No. 16/991,510, entitled "METHOD AND SYSTEM FOR PERFORMING IMAGE CLASSIFICATION FOR OBJECT RECOGNITION," and filed on Aug. 12, 2020 (now U.S. Pat. No. 11,538,238), the entire content of which is incorporated by reference herein. For instance, performing the classification may involve generating one or more bitmaps (also referred to as masks) based on the target image portion, wherein the one or more bitmaps may indicate whether the target image portion has visual features for feature detection, or whether there is spatial variation among pixel intensity values of the target image portion. In one example, the one or more bitmaps may include, e.g., a descriptor bitmap, an edge bitmap, and/or a standard deviation bitmap.

In some implementations, the descriptor bitmap may provide a heat map or probability map for identifying which region(s) of the target image portion are occupied by one or more descriptors (also referred to as one or more descriptor regions), or for indicating whether one or more descriptors are present in or detected from the target image portion. The descriptor bitmap may be generated by the computing system 101 based on, e.g., detecting descriptor keypoints, if any, in the target image portion, wherein the descriptor keypoints may indicate center locations or other locations of the descriptor regions. In some instances, the keypoint detection may be performed using a technique such as the Harris Corner detection algorithm, the scale-invariant feature transform (SIFT) algorithm, the speeded up robust features (SURF) algorithm, the feature from accelerated segment test (FAST) detection algorithm, and/or the oriented FAST and rotated binary robust interdependent elementary features (ORB) algorithm. The computing system 101 may further be configured to determine respective sizes of the descriptor regions, if any, based on a scale parameter value associated with the descriptor keypoint detection. In some cases, the computing system may perform the classification based on a quantity of descriptors identified by the descriptor bitmap.

In some implementations, the edge bitmap may be a heat map or probability map for indicating which regions of the target image portion contain one or more edges, or for indicating whether one or more edges are present in or detected from the target image portion. The computing system 101 may detect edges in the target image portion (if any edges exist) using a technique such as the Sobel edge detection algorithm, the Prewitt edge detection algorithm, the Laplacian edge detection algorithm, the Canny edge detection algorithm, or any other edge detection technique.

In some implementations, the standard deviation bitmap may describe local variation in pixel intensity value around pixels in the target image portion, or may indicate a lack of variation in pixel intensity value around pixels in the target image portion. For instance, the computing system 101 may generate the standard deviation bitmap by determining, for each pixel of the target image portion, a standard deviation among pixel intensity values in an image region surrounding that pixel. In some cases, the computing system 101 may perform the classification based on a characteristic of the standard deviation bitmap, such as its maximum value, minimum value, or average value.

In some implementations, the computing system 101 may perform the classification in step 306 based on the one or more bitmaps. For instance, the computing system 101 may combine the descriptor bitmap, the edge bitmap, and/or the standard deviation bitmap to generate a fused bitmap and/or a texture bitmap. In some cases, the fused bitmap or texture bitmap may be generated in a manner that further takes into account an effect of a lighting condition on one or more regions of the target image portion (e.g., 511). The fused bitmap or the texture bitmap may identify one or more textured regions or one or more textureless regions in the target image portion. In such cases, the computing system 101 may be configured to classify the target image portion (e.g., 511) as being textured or textureless based on a total area of the one or more textured regions (if any) in the target image portion and/or a total area of the one or more textureless regions (if any) in the target image portion.

Referring back to FIG. 3, the method 300 may further include a step 308, in which the processing circuit 110 of the computing system 101 selects a template storage space. More specifically, the template storage space may be selected from among the first template storage space 181 and the second template storage space 182 (also referred to sensed structure information as the selected template storage space) discussed above, wherein the selection may be based on whether the target image portion is classified as textured or textureless. As discussed above, the first template storage space 181 may be cleared more often relative to the second template storage space 182. For instance, the first template storage space 181 may act as a cache or other short-term template storage space, while the second template storage space 182 may act as a long-term template storage space, such as a template storage space in which templates are permanently stored, or are stored for a long time (e.g., months or years) before being removed. In this embodiment, information or other content in the first template storage space 181 may be more temporary than information or other content in the second template storage space 182. As an example, templates stored in the first template storage space 181 may be specific to a current task, such as de-palletizing a stack of boxes currently on a pallet, and may be cleared from the first template storage space 181 after completion of that task. In such an example, templates in the second template storage space 182 may be considered relevant to not only the current task, but also to subsequent tasks. Thus, the templates in the second template storage space 182 may remain therein after completion of the current task, so that the templates in the second template storage space 182 may still be available for facilitating object recognition during subsequent tasks. In other words, the templates in the second template storage space 182 may be reused for other tasks, while the templates in the first template storage space 181 may be specific to a particular task, and are not reused for other tasks.

In an embodiment, the template storage space that is selected in step 308 may be the first template storage space 181 in response to a determination by the computing system 101 to classify the target image portion (e.g., 512/513/514) as being textureless, and may be the second template storage space 182 in response to a determination by the computing system 101 to classify the target image portion (e.g., 511) as being textured. If the first template storage space 181 is used as a cache or other short-term template storage space, and the second template storage space 182 is used as a long-term template storage space, then the selection in step 308 may be between the short-term template storage space and the long-term template storage space. In an example, if a target image portion is classified as being textureless, performing object recognition may involve comparing the target image portion against existing templates in the short-term template storage space. In this example, performing object registration (if it is performed) may involve generating a new textureless template based on the target image portion and storing the textureless template in the short-term template storage space. In this example, if the target image portion is classified as being textured, performing object recognition may involve comparing the target image portion against existing templates in the long-term template storage space, and performing object registration (if it is performed) may involve generating a new textured template based on the target image portion, and storing the textured template in the long-term template storage space.

As stated above, using a combination of the short-term template storage space and the long-term template storage space may provide a technical advantage of reducing storage resources needed for storing templates used in an object recognition operation, and facilitating performing the object recognition operation in a fast and efficient manner. In an embodiment, the object recognition may be based on attempting to match visual detail or other visual information captured by an image capture device with visual detail or other visual information described by a template. In some cases, presence of visual texture or a level of visual texture in a target image portion may indicate a level of visual information that is available to be used for performing object recognition. A high level of visual texture may indicate a high level of visual information with which to perform object recognition, while a low level of visual texture or a lack of visual texture may indicate a low level of visual information with which to perform object recognition. Thus, a target image portion which is textured may be valuable for performing object recognition, because it may provide a high level of visual information with which to perform the object recognition. In some cases, a target image portion that is textureless may not be as valuable as a textured image portion for performing object recognition, but may still have some usefulness for performing object recognition. For instance, if the object recognition is being performed during a task such as de-palletizing a stack of boxes from a pallet, some or all of the boxes on the pallet may be holding the same merchandise from the same retailer or manufacturer, and thus may likely have the same visual design, or more generally the same object design. For example, object 412 in FIG. 4B may have a same object design, and more specifically a same visual design and physical design, as the object 422 in FIG. 7A. Thus, generating a template based on a target image portion representing one of the boxes, even if the target image portion is classified as textureless, may still be useful because the textureless template may likely match an appearance of another box on the same pallet. In some cases, the textureless template may include both a visual feature description and an object structure description, so that both types of information may be checked during an object recognition operation to improve an accuracy of the object recognition. However, generating templates for both textured and textureless target image portions can add costs to performing object recognition and/or to performing object registration. In some cases, the added costs may include increased storage resources needed for storing the templates, because the textureless templates increase the total number of templates being stored. In some cases, the added costs may include slower performance, because the computing system 101 may have to search through a greater number of templates in an attempt to find a template which matches an appearance of a particular object. If a large number of textureless templates are generated, there may be an increased likelihood of one of the textureless templates being incorrectly matched to the appearance of a particular object, especially if the textureless templates include similar visual feature descriptions or other visual information.

In an embodiment, one aspect of the present disclosure relates to addressing the above issues by using the first template storage space 181 specifically for storing textureless templates, and using the second template storage space 182 specifically for storing textured templates. The first template storage space 181 may be used as a cache or other short-term template storage space, while the second template storage space may be used as a long-term template storage space. As stated above, a target image portion which is classified as being textureless may be used to generate a new textureless template that is stored in the first template storage space 181, and/or to compare against existing textureless templates in the first template storage space 181. Similarly, a target image portion that is classified as being textured may be used to generate a new textured template which is stored in the second template storage space 182, and/or to compare against existing textured templates in the second template storage space 182. In some implementations, the computing system 101 may be configured to associate a textureless flag with each of the textureless templates, so as to tag them as being textureless. In this embodiment, the second template storage space 182 may be reserved for storing textured templates, which may limit a total number of templates therein. Such a result may limit storage resources needed to store the textured templates. The limited total number of templates in the second template storage space 182 may further limit how many templates the computing system 101 has to search through to find a match for an object's appearance, which may lead to faster performance for an object recognition operation.

As further stated above, the first template storage space 181 may be a short-term storage space that is cleared more often than the second template storage space 182. For example, the first template storage space 181 may store textureless templates that are generated based on objects involved in a specific task, such boxes involved in a specific de-palletization task. If the de-palletization task involves moving all containers or other objects from a pallet to a desired destination, the task may be referred to as a de-palletization cycle. In such an example, the textureless templates may be cleared from the first template storage space 181 after completion of the de-palletization cycle. As stated above, the textureless templates may be useful for de-palletizing objects involved in the same de-palletization cycle because, e.g., some or all of the boxes or other objects may likely have a common visual design, or more generally a common box design. These textureless templates may have less usefulness or relevance for a subsequent task, such as that of de-palletizing another stack of boxes during another de-palletization cycle, because boxes from two different de-palletization cycles may be less likely to share a common visual design. Thus, textureless templates may be cleared from the first template storage space 181 or any other template storage space upon or after completion of the earlier task. Clearing a template from the first template storage space 181 may involve deleting the template, such as by deleting a pointer or reference to the template, or by de-allocating a portion(s) of the first template storage space 181 occupied by the template, so that the template can be overwritten. In some cases, when the subsequent de-palletization cycle or other task begins, the first template storage space 181 may be empty or marked as empty, and any textureless templates that are stored in the first template storage space 181 during the subsequent de-palletization cycle may be specific to objects involved in that cycle. Clearing the first template storage space 181 may reduce storage resources needed for the first template storage space 181, by limiting a total number of templates therein. Clearing the first template storage space 181 may further lead to faster performance of an object recognition operation, by reducing the number of textureless templates that the computing system 101 has to search through when attempting to find a match with a textureless target image portion or other target image portion. In some cases, all templates which are associated with the textureless flag may be cleared, regardless of whether they are in the first template storage space 181. In some examples, the first template storage space 181 may be storing at most a few templates at a time. The small number of templates in the first template storage space 181 may further reduce a likelihood of the computing system 101 incorrectly identifying one of the templates as being a match for a particular target image portion.

In an embodiment, the method 300 of FIG. 3 may include a step 310, in which the processing circuit 110 of the computing system 101 performs object recognition, which may be based on the target image portion generated in step 304 and the template storage space selected in step 308. In some cases, step 310 may be performed by the object recognition module 207. A result of the object recognition may be used, e.g., for controlling robot interaction with an object represented by the target image portion (e.g., object 411), or to determine whether to perform object registration as part of, e.g., performing inventory management, as discussed below in more detail.

Figure 5C:
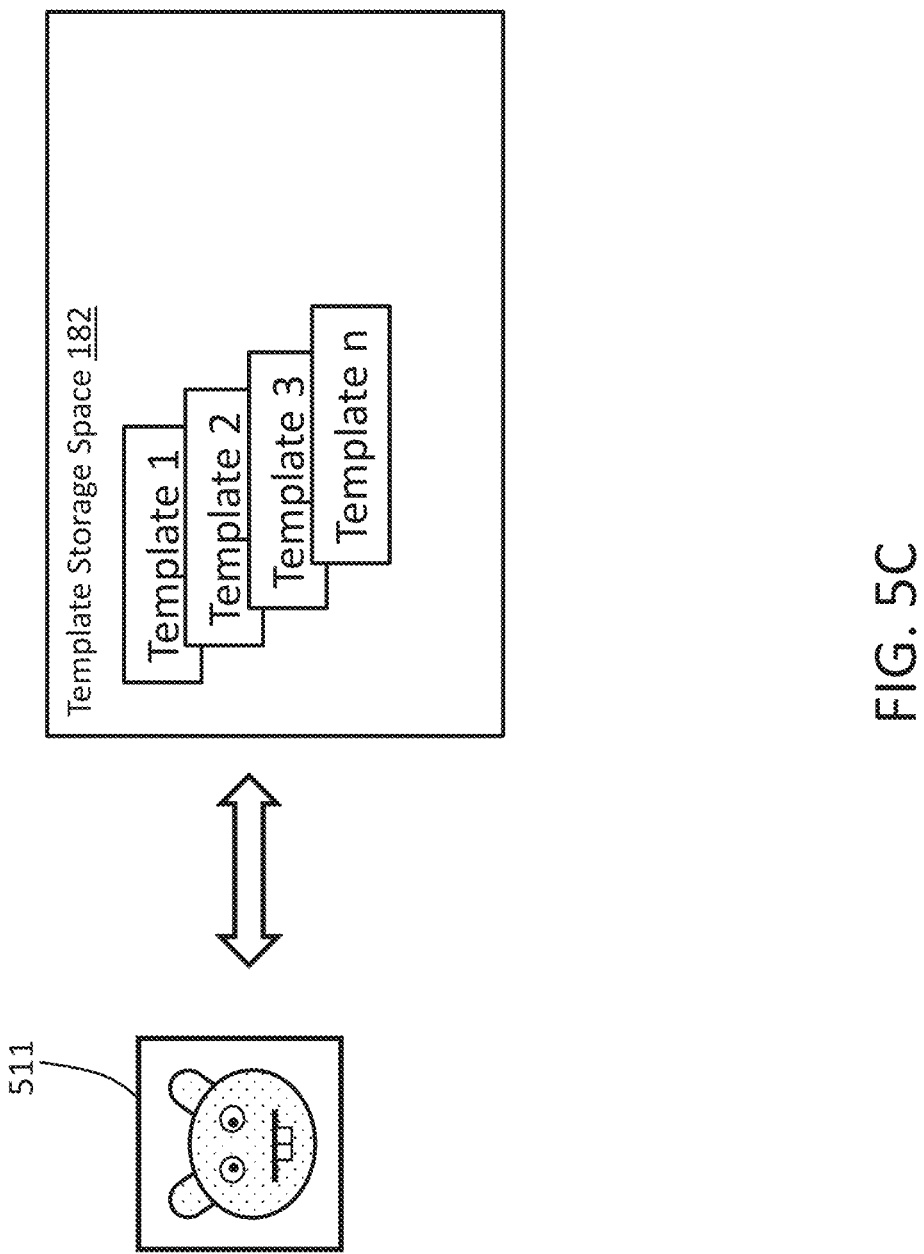

In some cases, performing step 310 may involve determining whether the selected template storage space already includes a template that matches the target image portion. If the selected template storage space has no template which matches the target image portion, the computing system 101 may perform an object registration operation by generating a template based on the target image portion. In some instances, the template is generated only if there fails to be a match. For instance, FIG. 5C depicts an example in which the target image portion 511, which is classified in step 306 as being textured, and in which the second template storage space 182 is selected in step 308. In this example, the target image portion 511 is compared against existing templates in the second template storage space 182, which may be used as a long-term template storage space that stores textured templates. In some implementations, the templates in the template storage space 182 (and/or in the first template storage space 181) may include a visual feature description, which describes one or more visual features (if any) associated with a particular visual design, or more generally with a particular object design. The one or more visual features may refer to presence of visual detail or visual marking associated with the visual design, or to a characteristic of the visual detail or visual marking. In some instances, the visual feature description may include image information that reproduces such visual details, or may include one or more descriptors that encodes such visual details. In such implementations, the computing system 101 may perform the object recognition operation by determining whether visual feature description included in a template matches visual details, if any, in the target image portion (e.g., 511). For example, the computing system 101 may be configured to generate descriptors which describe the target image portion (e.g., 511), and to determine whether the descriptors match a visual feature description of any of the templates in the selected template storage space (e.g., 182). In some instances, if the target image portion matches one of the existing templates, the matching template may be used to generate a detection hypothesis, which may be a hypothesis regarding what object, type of object, or object design is represented by the target image portion.

Figure 5D:
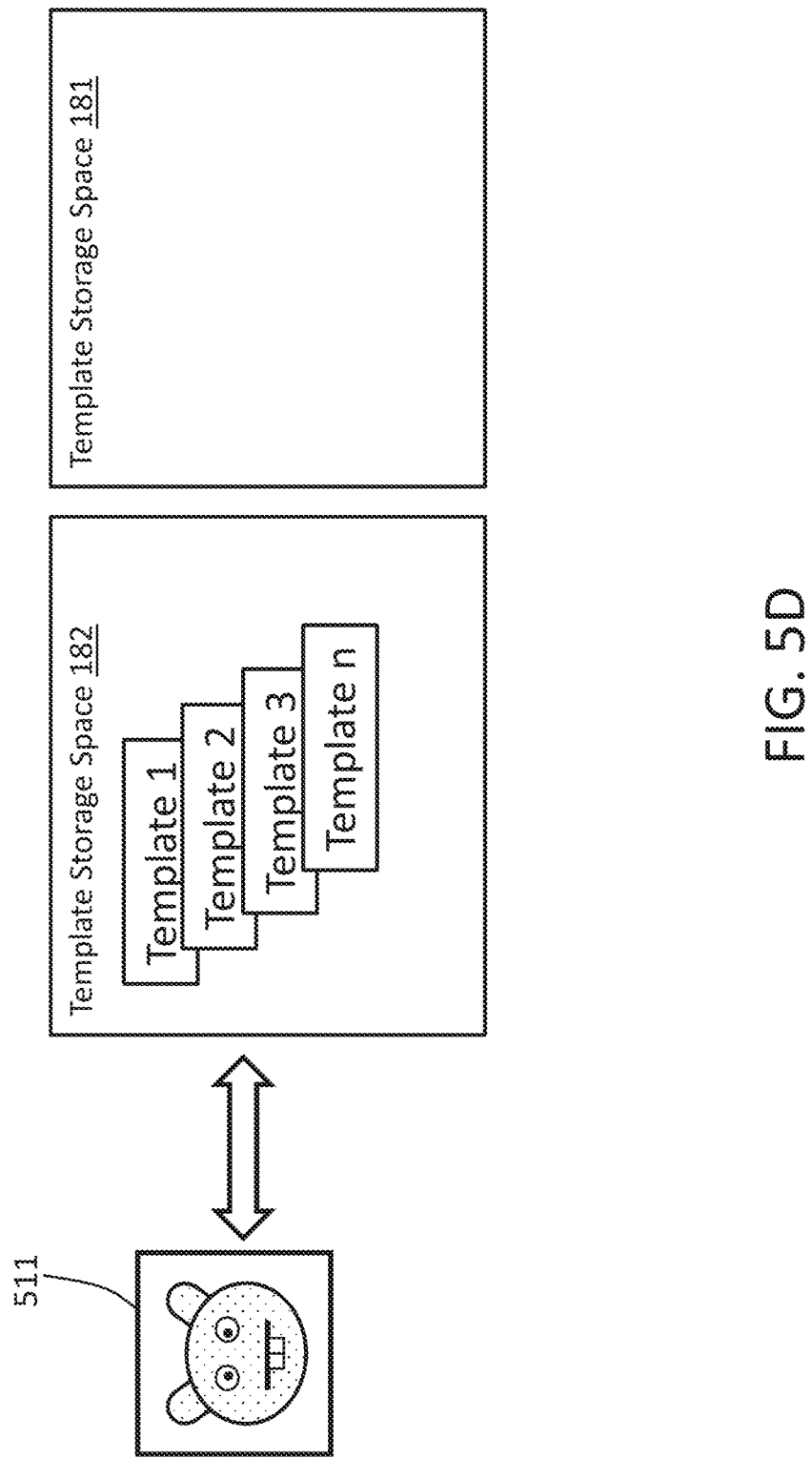

As depicted in FIG. 5C, the computing system 101 may compare the target image portion 511 against textured templates in the second template storage space 182 because the target image portion 511 is classified as being textured. In an embodiment, the target image portion 511 may be compared against only templates in the second template storage space 182. In another embodiment, as depicted in FIG. 5D, the computing system 101 may compare the target image portion 511 against all existing stored templates, including textured templates in the second template storage space 182 and textureless templates (if any exist) in the first template storage space 181.

In some instances, if the target image portion matches one of the existing templates in the selected template storage space 182, the matching template may include an object structure description that describes a physical structure of an object represented by the target image portion (e.g., 511). For example, the object structure description may describe an object size or an object shape of the object (e.g., 411). In some cases, the object structure description in the matching template may be used to plan and/or control robot interaction with the object, as discussed below in more detail.

Figure 5E:
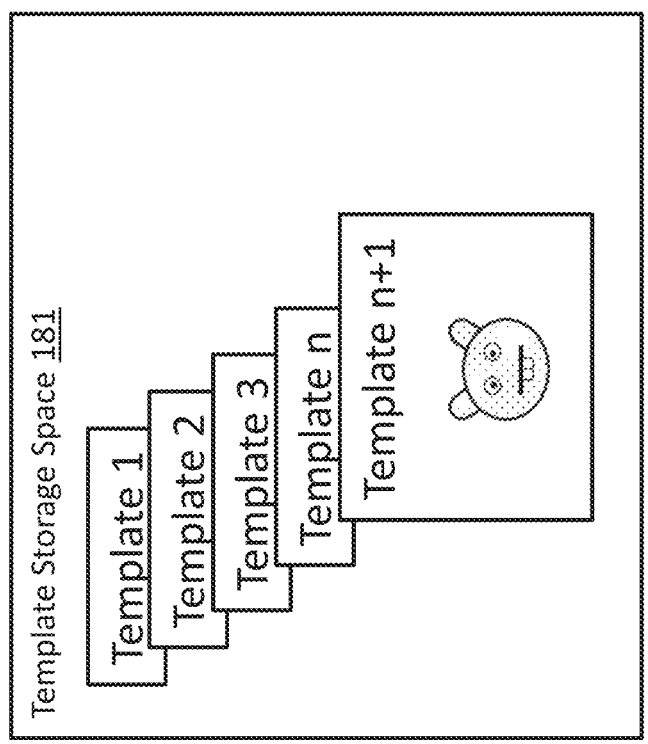

In some instances, if the processing circuit 111 of the computing system 101 determines that the selected template storage space does not have a template which matches the target image portion (e.g., 511), the computing system 101 may perform object registration by generating a new template based on the target image portion (e.g., 511), and to cause the new template to be stored in the selected template storage space. In some instances, the new template may be generated in response to a determination that none of the templates in the first template storage space 181 and/or the second template storage space 182 match the target image portion (e.g., 511). FIGS. 5C through 5E depict an example in which the target image portion 511 does not match any of the existing templates (Templates 1 through n) in the second template storage space 182, or does not match any existing stored template (including templates in both the first template storage space 181 and the second template storage space 182). As depicted in FIG. 5E, the computing system 101 may generate a new textured template, namely Template n+1, that describes a visual design associated with the target image portion 511, and that more generally describes an object design for an object 411 represented by the target image portion 511. For example, Template n+1 may describe the picture 411A printed on a top surface of the object 411. More specifically, the new template may reproduce the picture 411A or other visual marking appearing in the target image portion 511, or include descriptors which describe various visual features of the picture 411A. The new template may be stored in the second template storage space 182, which may act as a long-term template storage space. In some cases, if a spatial structure sensing device (e.g., 442) is used in method 300 to generate sensed structure information that describes a structure associated with the object 411, the computing system 101 may generate an object structure description based on the sensed structure information, and include the object structure description in the new template. The object structure description may describe, e.g., an object size or object shape for the object 411.

In some cases, the computing system 111 may be configured to attempt to detect a minimum viable region (MVR) if the computing system 101 determines that the selected template storage space does not have a template which matches the target image portion (e.g., 511), or if the computing system 101 determines that none of the template storage spaces 181, 182 has a template which matches target image portion. Minimum viable regions are discussed in more detail in U.S. patent application Ser. No. 16/443,743, entitled "AUTOMATED PACKAGE REGISTRATION SYSTEMS, DEVICES, AND METHODS, the entire content of which is incorporated by reference herein. In some cases, the MVR detection may be performed in response to both a determination that the target image portion (e.g., 511) is classified as being textured, and a determination that there is no matching template in the selected template storage space (e.g., 182), or that there is no matching template in all of the template storage spaces 181, 182. The MVR detection may be performed on the target image portion to estimate a location of an object's edge or corner, wherein the location may be used, e.g., to control robot interaction with the object and/or to generate the new template discussed above. More particularly, the computing system 101 may in an embodiment detect at least one of a corner or an edge in the target image portion (e.g., 511), and determine a region defined by at least the corner or the edge. For instance, the computing system 101 may determine pixel coordinates at which corners or edges appear in the target image portion (e.g., 511) or in the received image (e.g., 501), and determine a region of the target image portion or of the image that is surrounded by the edges or corners. The determined region may be used to generate the new template discussed above, and/or to plan robot interaction with the object, such as by determining a movement command for controlling robot motion.

As stated above, the target image portion 511 may in some scenarios represent one of multiple objects in a field of view (e.g., 443) of an image capture device (e.g., 441). In some instances, the computing system 101 may be configured to cause each new template which is added to either the first template storage space 181 or the second template storage space 182 to be based on a respective target image portion for a corresponding object of the multiple objects. In an embodiment, various steps described herein (e.g., 304-310) may be performed multiple times for each image (e.g., 501) that is received in step 302. For instance, steps 304-310 may be performed for each object of the multiple objects represented in the received image 501, which represents objects 411-414.

More particularly, the above discussion involving FIGS. 5A-5E relates to performing steps 304-310 for the target image portion 511, which represents the object 411. FIG. 6A depicts step 304 being applied to generate target image portions 512, 513, and 514, which represent the objects 412, 413, and 414, respectively. The target image portions 512-514 may be generated over several iterations of step 304, or may be generated in one iteration. In some cases, the target image portions 512-514 may be extracted from the image 501. The computing system 101 may further perform step 306 on the target image portions 512-514, by classifying them as being textured or textureless. In some implementations, the computing system 101 may classify the target image portions 512-514 as being textureless, because they may have no visual texture, or may not have a defined level of visual texture. As a result of the classification, the computing system 101 may perform step 308 by selecting the first template storage space 181 for each of the target image portions 512-514, and may perform object recognition in step 310 based on the selected template storage space, namely the first template storage space 181.

Figure 6B:
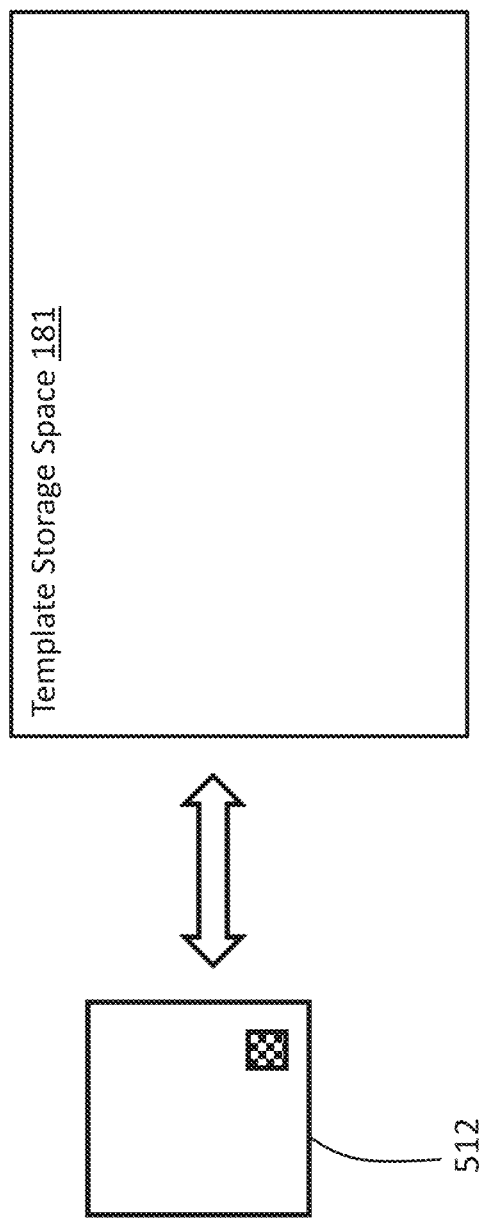
Figure 6C:
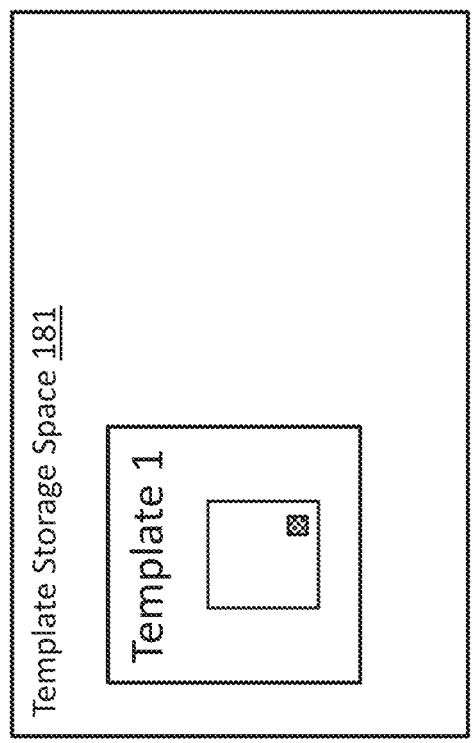

FIG. 6B depicts an example in which object recognition and/or object registration is performed for the target image portion 512, or more generally for the object 412 which is represented by the target image portion 512. In an embodiment, the object recognition operation may involve the computing system 101 determining whether the selected first template storage space 181 has a template that matches the target image portion 512. In this example, the computing system 101 may determine that the first template storage space 181 is empty, and thus does not have a template which matches the target image portion 512. The first template storage space in FIG. 6B may be empty because it may have been cleared after completion of a previous robot task (e.g., a previous de-palletization cycle). In some embodiments, the computing system 101 may search for a matching template for the target image portion 512 in only the first template storage space 181. In other embodiments, the computing system 101 may search for a matching template for the target image portion 512 in both the first template storage space 181 and the second template storage space 182. In the example of FIG. 6B, the computing system 101 may determine that there is no matching template for the target image portion 512, and may further perform an object registration operation by generating a new textureless template based on the target image portion 512, and causing the new textureless template to be stored as Template 1 in the first template storage space 181 (e.g., in a template cache), as illustrated in FIG. 6C. The template may include, e.g., a visual feature description that describes an appearance of the object 412, or that more specifically describes the target image portion 512. For example, the visual feature description may include the target image portion 512 itself, or include descriptors which encode visual details of the target image portion 512. In some implementations, if the spatial structure sensing device 442 is used in method 300, the computing system 101 may receive spatial structure information generated by the spatial structure sensing device 442 to generate an object structure description that describes a structure of the object 412 (e.g., object size or object shape) represented by the target image portion 512. The computing system 101 in such implementations may include the object structure description as part of the new template.

Figure 6D:
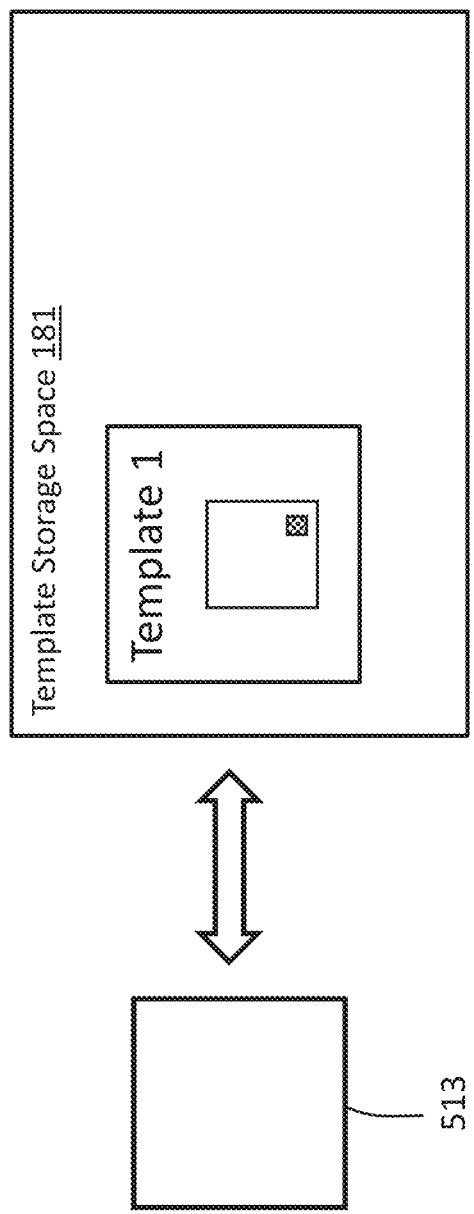
Figure 6E:
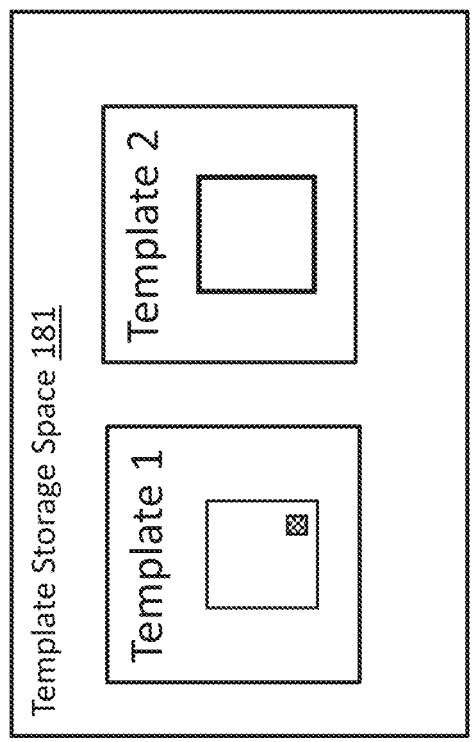

FIG. 6D depicts an example in which object recognition is performed for the target image portion 513, or more generally for the object 413 represented by the target image portion 513. In the example of FIG. 6D, the first template storage space 181 may include Template 1 (which is generated based on the target image portion 512), and the computing system 101 may be configured to determine, e.g., whether a visual feature description in Template 1 matches the target image portion 513. As stated above, the computing system 101 may attempt to find a matching template from only the first template storage space 181, or may alternatively attempt to find a matching template from the first template storage space 181 and the second template storage space 182. In this example, the computing system 101 may determine that the target image portion 513 does not match Template 1, or more generally that there is no matching template. As a result, the computing system 101 may perform object registration by generating a new textureless template based on the target image portion 513, and store the new template as Template 2 in the first template storage space 181, as illustrated in FIG. 6E. Although Template 2 describes little or no visual detail, it may still describe some detail associated with its corresponding object (e.g., 413) which may be useful for later comparison with other objects. For instance, Template 2 may describe an aspect ratio associated with a top surface or other surface of the corresponding object. The aspect ratio may describe, e.g., a ratio between a length and a width of that surface. The computing system may be configured to later compare this aspect ratio described in the template against an aspect ratio of other objects.

Figure 6F:
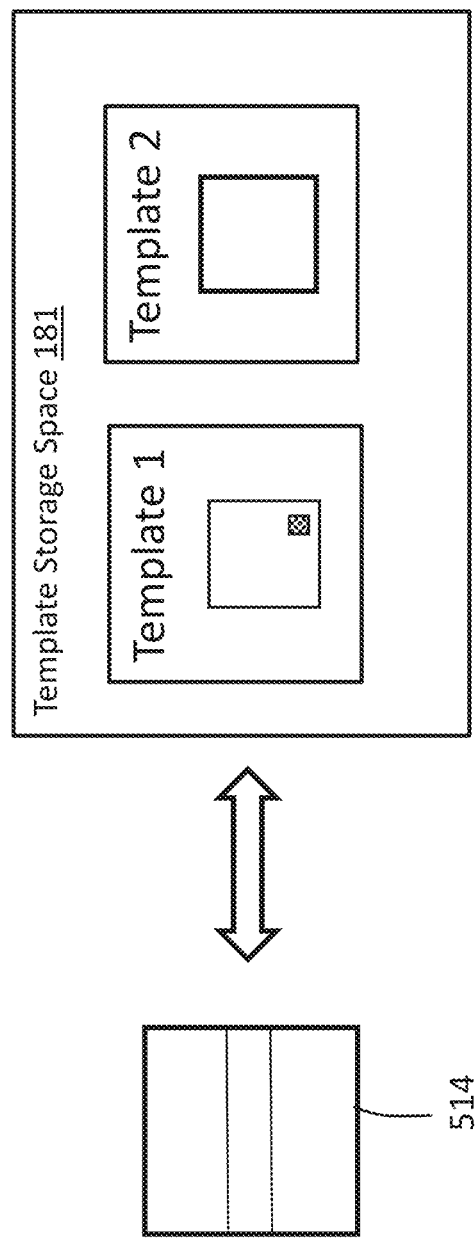

Similarly, FIG. 6F depicts an example in which object recognition is performed for the target image portion 514, or more generally for the object 414 represented by the target image portion 514. More specifically, the computing system 101 may determine whether there is a matching template for the target image portion 514, such as by determining whether the target image portion 514 matches existing Template 1 and Template 2 in the first template storage space 181. In this example, the computing system 101 may determine that neither template matches the target image portion 514. As a result, the computing system 101 may further perform object registration by generating a new textureless template based on the target image portion 514, and store the new template as Template 3 in the first template storage space 181, as illustrated in FIG. 6G.

Figure 6G:
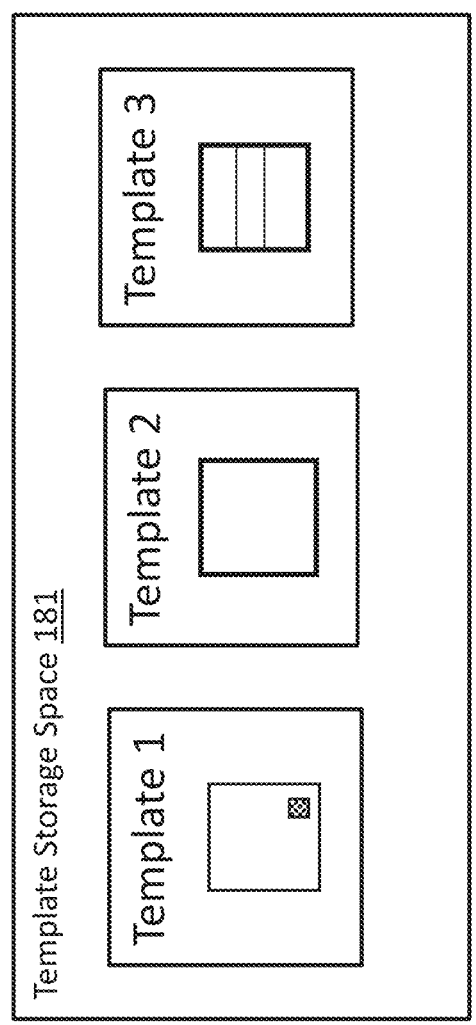

As stated above, the computing system 101 may include an object structure description in a textureless template, such as Template 1, 2, or 3 in FIG. 6G, instead of or in addition to a visual feature description. In some cases, determining whether a target image portion which is textureless (e.g., 513/514) matches a textureless template (e.g., Template 1 or Template 2) may in some cases involve determining whether there is a match in structure, or more specifically a match between the structure of a corresponding object (e.g., 413/ 414) and the object structure description in a particulate template. For example, the computing system 101 may both extract a target image portion (e.g., 514) which represents the object and receive sensed structure information regarding that object (e.g., 414). In such an example, the computing system 101 may determine whether the object (e.g., 414) matches a template (e.g., Template 1 or Template 2 of FIG. 6F) by determining whether the object's structure (as described in the sensed structure information) matches the object structure description in the template. In some cases, determining a match based on the object structure description may improve a robustness or reliability of the object recognition. More specifically, because a textureless template may have been generated based on an image portion which has relatively little visual detail, performing object recognition based on visual appearance alone may lack optimal robustness or reliability. Thus, the object recognition may alternatively or additionally be based on physical structure described by the object structure description, such as by determining both whether a target image portion (e.g., 514) for an object (e.g., 414) matches a visual feature description in a template and whether sensed structure information for the object (e.g., 414) matches an object structure description in the template.

In an embodiment, if the computing system 101 is attempting to search for a matching template for an object (e.g., 411) represented by a textured target image portion (e.g., 511), the computing system 101 may attempt to find a textured template which matches both an appearance of the object and a physical structure of the object, or may determine that a matching appearance alone is sufficient. In some cases, the textured target image portion (e.g., 511) and the textured templates may include sufficient visual detail to allow an accurate object recognition to be performed based on visual appearance of the object alone, even when the object's physical structure is not considered.

Figure 6H:
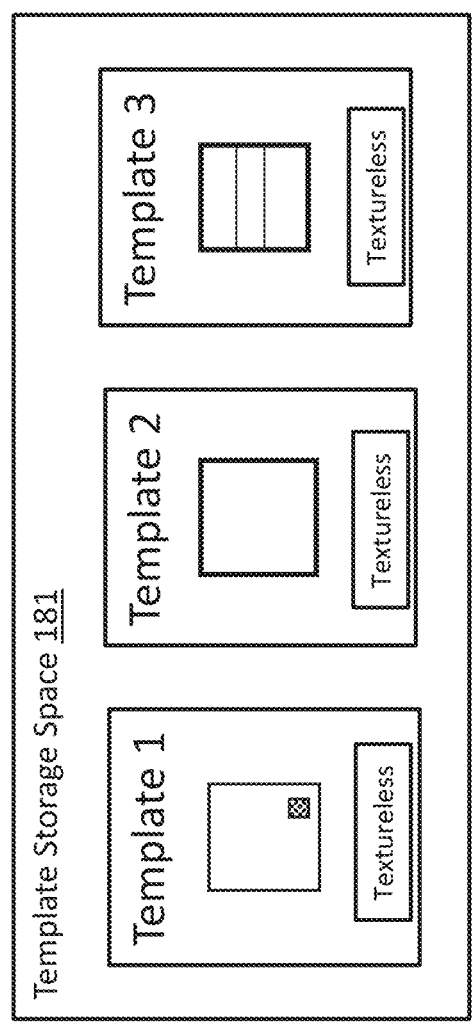

In an embodiment, the computing system 101 may associate each of the textureless templates with a textureless flag, such as by setting a template type parameter in the templates to a value which indicates that they are textureless. As an example, FIG. 6H depicts a textureless flag being included in each of Template 1 through Template 3 in the first template storage space 181. In some cases, when a de-palletization cycle or other task is complete, the computing system 101 may be configured to search for and delete all templates having the textureless flag.

Figure 6I:
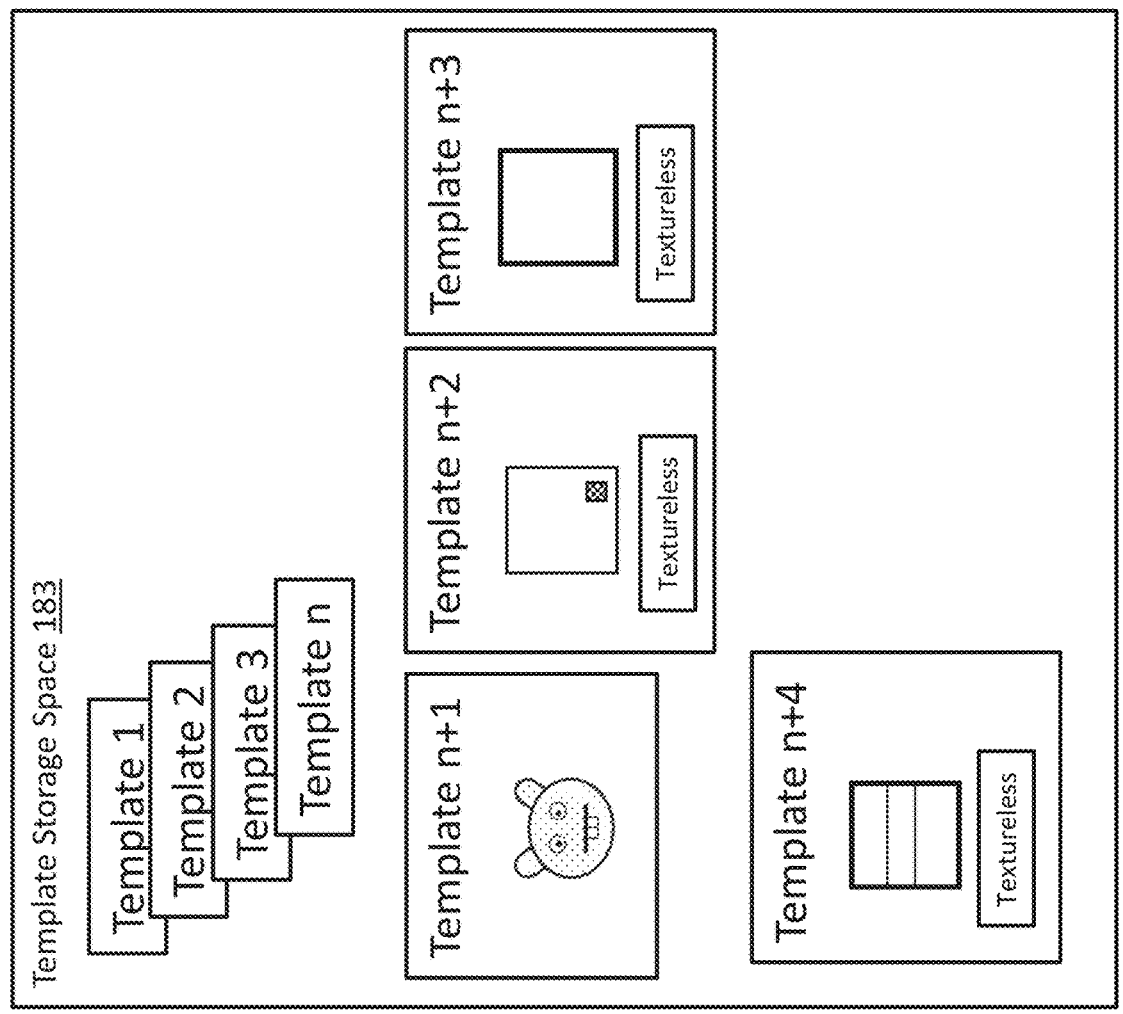

FIG. 6I depicts another embodiment that involves a textureless flag. While the above embodiments involve the first template storage space 181 (e.g., a template cache) and the second template storage space 182 (e.g., a long-term template database), FIG. 6I illustrates an alternative embodiment in which the first template storage space 181 and the second template storage space 182 are replaced by a single template storage space 183 (e.g., single file or single database). In this alternative embodiment, the method 300 may be modified to omit the selection of step 308, and may perform the object recognition of step 310 based on templates in the template storage space 183. For example, the computing system 101 may search the template storage space 183 for templates which match a target image portion (e.g., 511). As depicted in FIG. 6I, the computing system 101 may, during object registration, store newly generated templates in the template storage space 183, and include a textureless flag in those templates that are textureless. When a de-palletization cycle or other task is complete, the computing system 101 may search for and delete all templates in the template storage space 183 that has the textureless flag.

Returning to FIG. 3, the method 300 may in an embodiment further include a step 312, in which the processing circuit 110 of the computing system 101 generates a movement command for causing robot interaction with at least an object represented by a target image portion of step 304, such as one of objects 411-414. In some cases, step 312 may be performed by the motion planning module 208. In an embodiment, the movement command may be used for motion planning for a robot task, such as picking up a box or other object from a pallet and moving the object to a desired destination. The movement command may be generated based on a result from the object recognition. For instance, if the result of the object recognition indicates that there is no match with existing templates (if any) in a template storage space and causes object registration to be performed to generate a new template based on an appearance of an object, the movement command may be based on the new template. As an example, if the object 411 is one target of a de-palletization task that involves the robot 461 picking up the object 411, the computing system 101 may generate a movement command based on Template n+1 in FIG. 5E, which is based on the object 411, or more specifically based on its associated target image portion 511. The computing system 101 may output the movement command, which may be received by the robot 461 to interact with the object 411. As another example, if object 412 is another target of the de-palletization task, the computing system 101 may generate a movement command based on Template 1 in FIGS. 6C-6I, which is based on the object 412, or more specifically its associated target image portion 512. In an embodiment, the movement command may be generated based on an object structure description (if any) in the new template. In some cases, if the object recognition and/or object registration results in identifying a region based on MVR detection, the movement command may be based on the identified region. For example, the movement command may be generated to cause an end effector of the robot to move to a location corresponding to the identified region.

In an embodiment, if a result of the object recognition is that there is a match between a template in the selected template storage space (e.g., 181/182) and an object's appearance, or more specifically its target image portion, the computing system 101 may be configured to generate the movement command based on the matching template. In some cases, the movement command may be generated based on an object structure description in the matching template.

In an embodiment, if the computing system 101 generates a movement command to cause a robot (e.g., 461) to interact with an object that is represented by a target image portion, the movement command may be based on whether the target image portion is classified as textured or textureless. For instance, if the object recognition in step 310 is performed based on a target image portion that is textureless, a confidence level for the object recognition may be considered to be lower relative to a situation in which the target image portion is textured. In such a situation, the computing system 101 in step 312 may generate the movement command in a manner that limits a speed of the robot (e.g., 461) when the robot is attempting to pick up or otherwise interact with the object, so that the robot interaction may proceed with a higher level of caution.

Figure 7A:
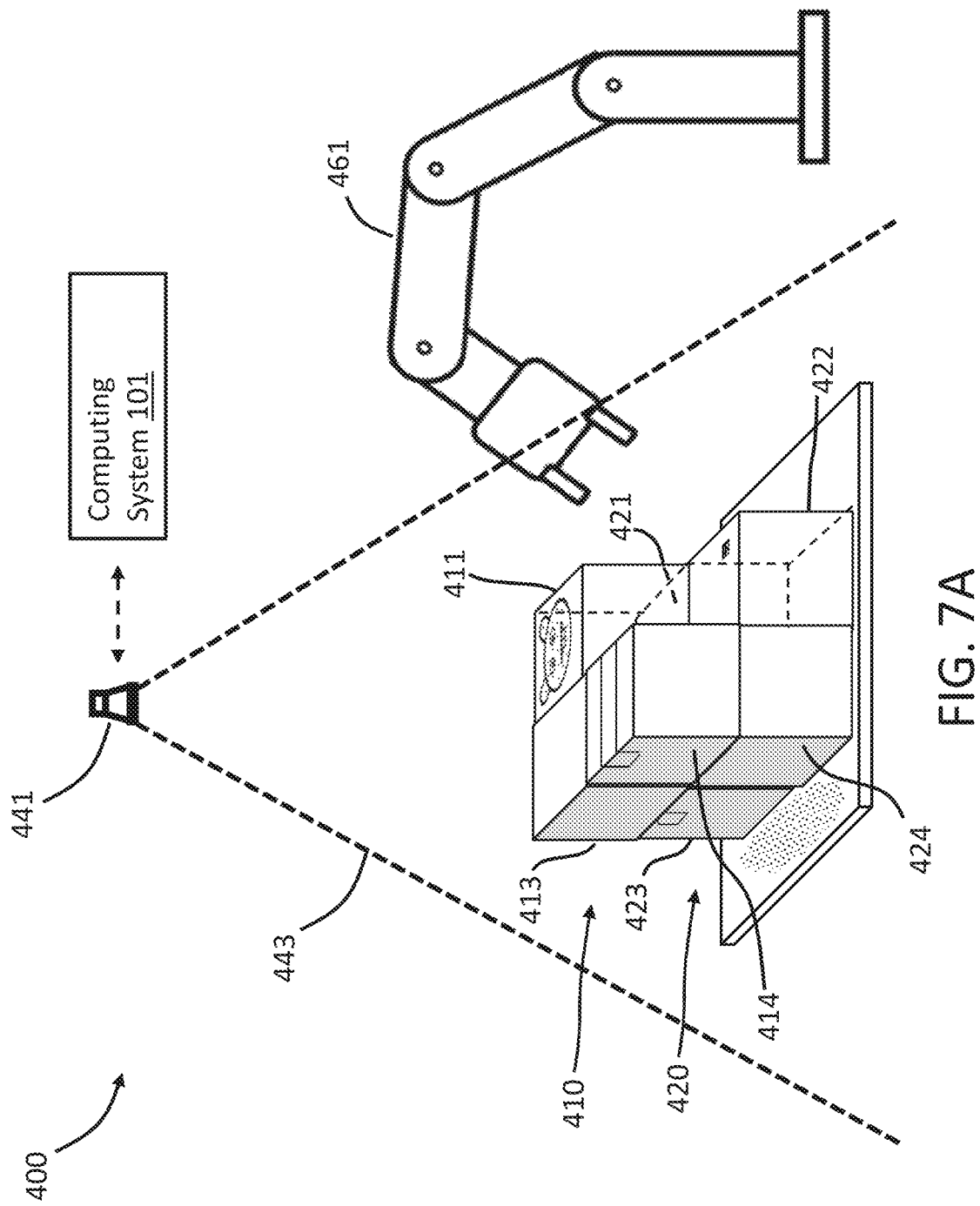
FIGS. 7A-7C illustrate aspects of performing object recognition, according to embodiments hereof.
Figure 7B:
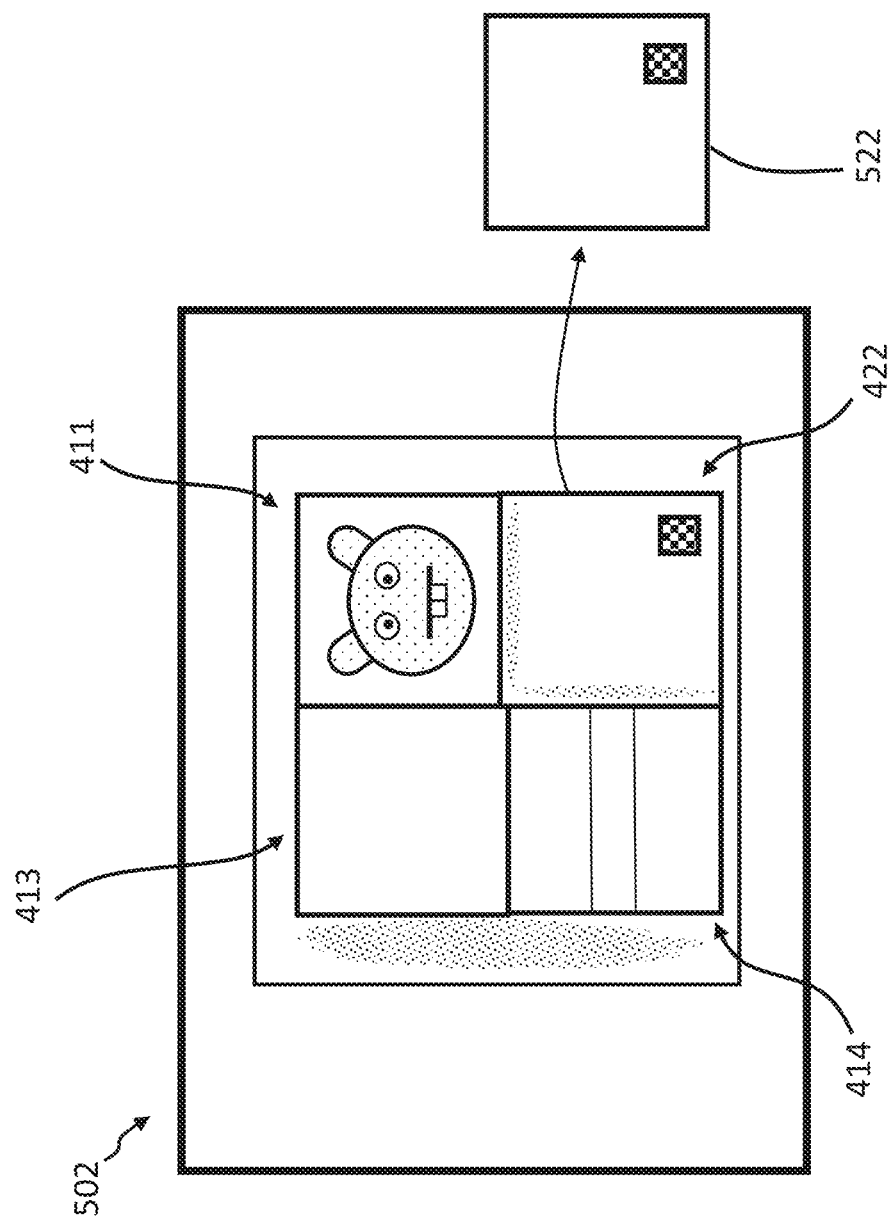

In an embodiment, if an image capture device (e.g., 441) generates an updated image after an object has been moved by a robot (e.g., 461) as a result of the movement command generated in step 312, the computing system 301 may be configured to repeat some or all of steps 302-312 based on the updated image. In some cases, the updated image may be generated each time an object is moved. For instance, FIG. 7A depicts an example in which the object 412 (in FIG. 4A) has been moved by the robot 461 to a destination which is outside of the field of view 443 of the image capture device 441. After the object 411 has been moved, the image capture device 441 may generate an updated image 502, which is depicted in FIG. 7B, that represents the remaining objects, namely objects 411, 413, 414, and 421-424.

Figure 7C:
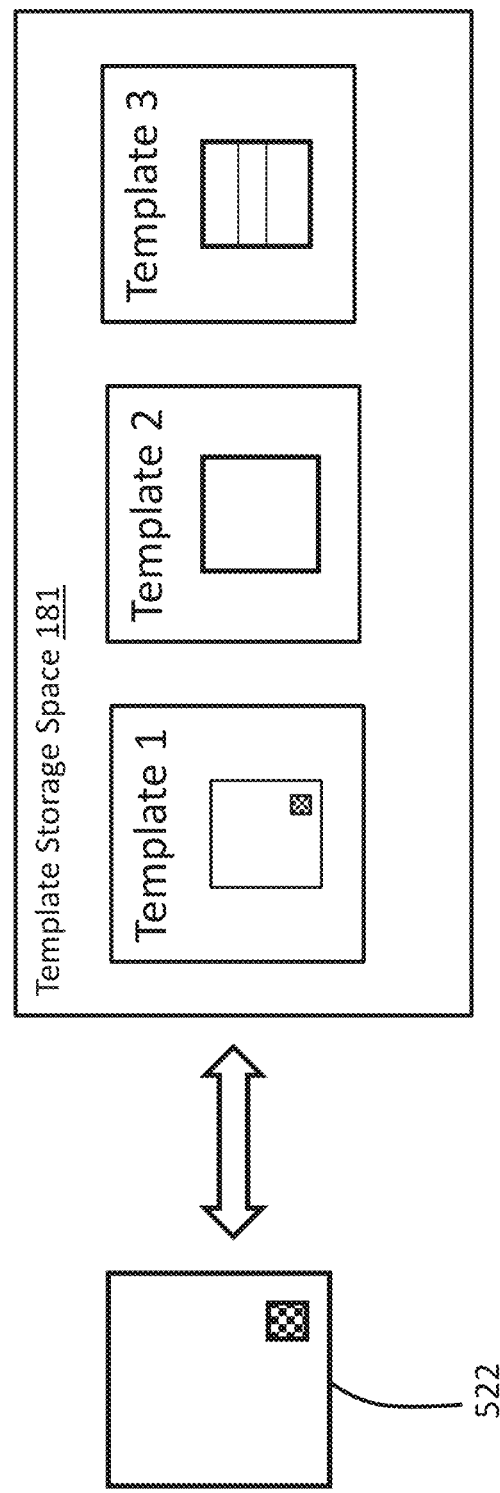

In an embodiment, the computing system 101 may perform steps 302 and 304 again to receive the updated image 502, and to generate a target image portion 522, which may be a portion of the image 502 that represents the object 422. In such an embodiment, the computing system 101 may further perform steps 306-310 again by classifying the target image portion 522 as being textured or textureless, selecting a template storage space based on the classification, and performing object recognition based on the selected template storage space. As an example, the target image portion 522 may be classified as being textureless. As a result, the computing system 101 may select the first template storage space 181, which may include the three templates from FIG. 6G or 6H. As depicted in FIG. 7C, the computing system 101 may be configured to perform an object recognition operation that determines whether the target image portion 522 matches a visual feature description and/or an object structure description in a template of the first template storage space 181. In some cases, this determination is not limited to the first template storage space 181, and the computing system 101 may determine whether the target image portion 522 matches a template in the first template storage space 181 or a template in the second template storage space 182. In the example of FIG. 7C, the computing system 101 may determine that the target image portion 522 matches Template 1 in the first template storage space 181. As a result of the match, the object registration operation may be omitted, such that no new template is generated. In some scenarios, the computing system 101 may repeat step 312, by generating a movement command based on a result of the object recognition. For example, if Template 1 matches the target image portion 522 and includes an object structure description that describes a particular object structure, the movement command may be generated based on the object structure description.

Figure 8A:
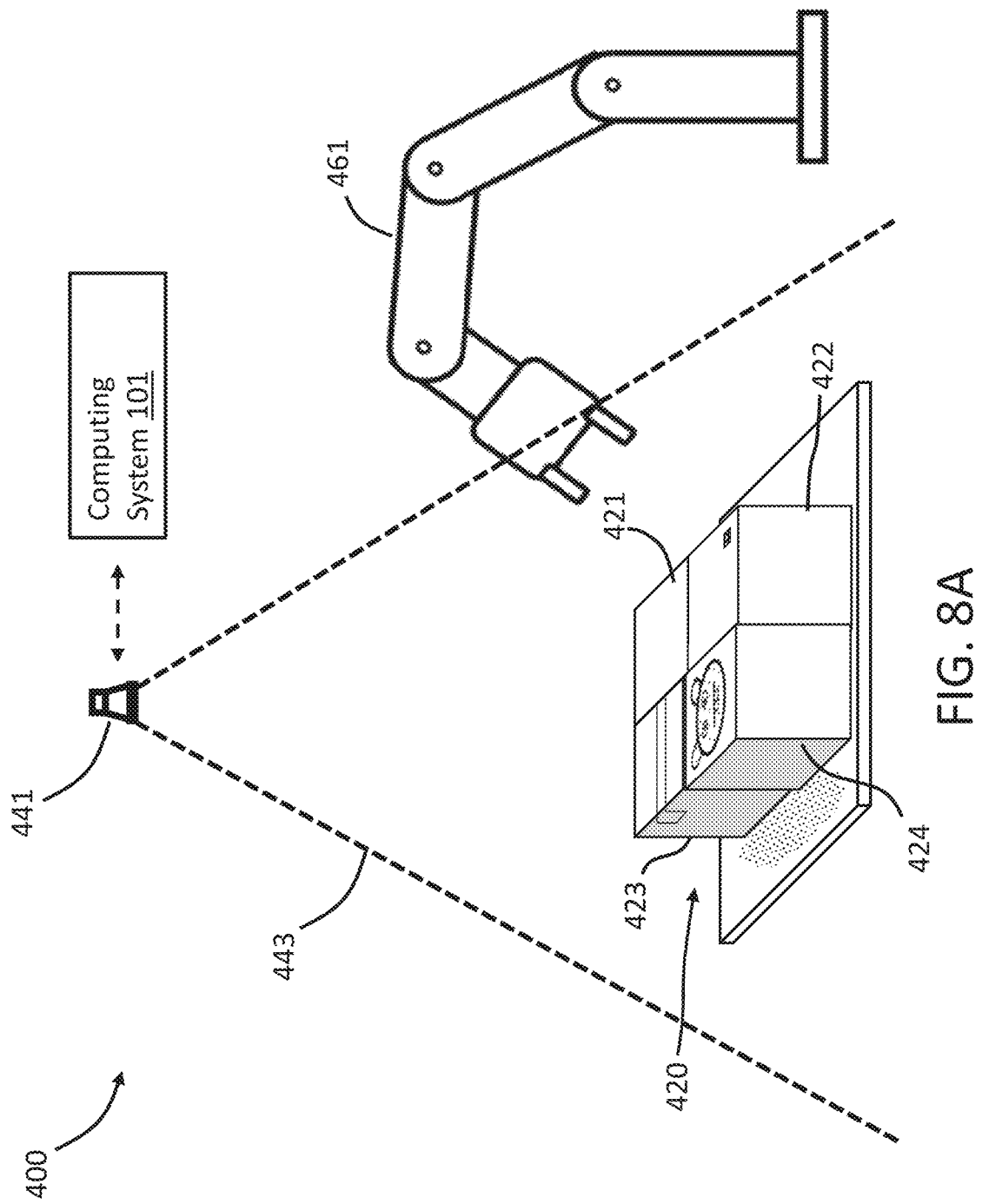
FIGS. 8A-8E illustrate aspects of performing object recognition, according to embodiments hereof.
Figure 8B:
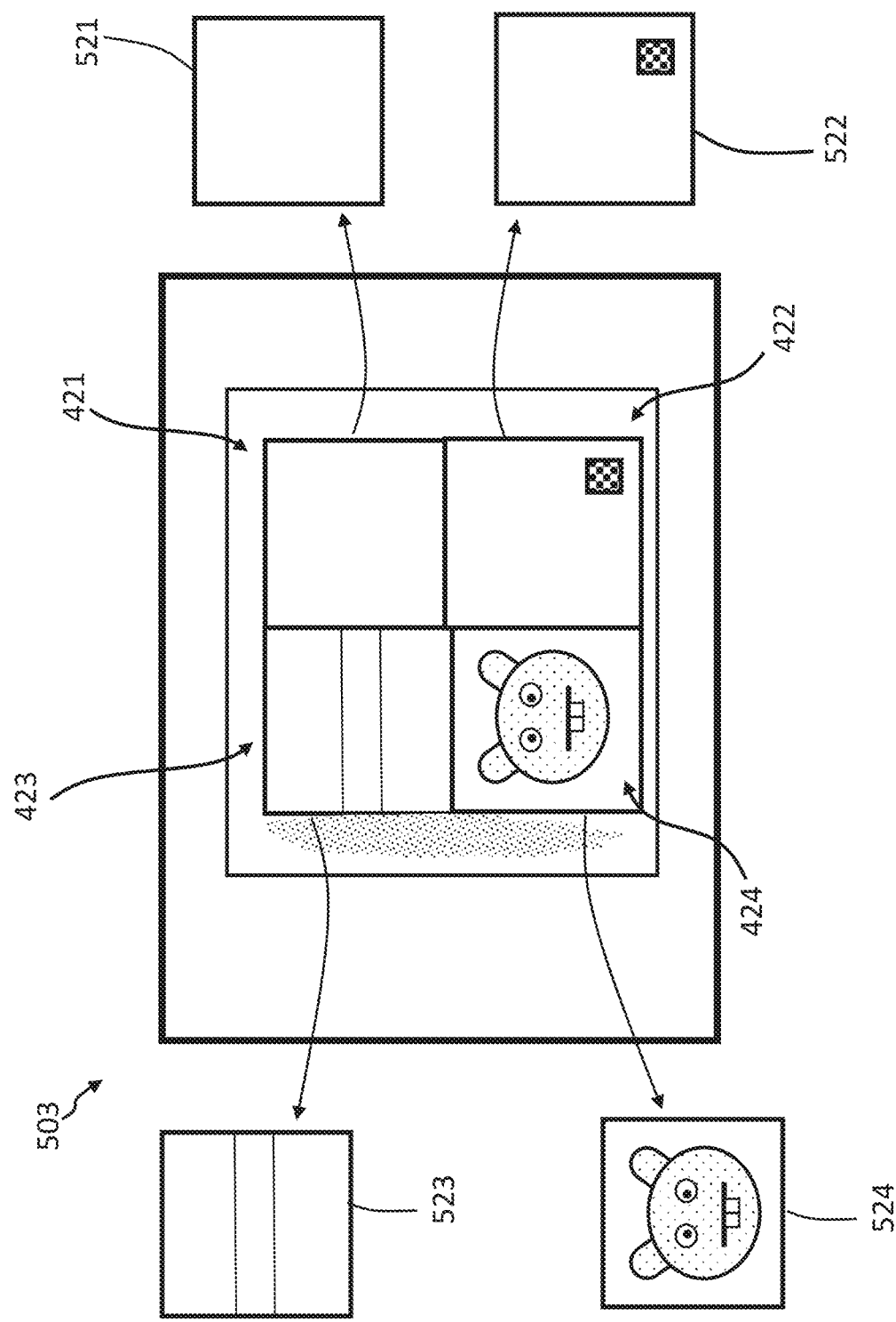
Figure 8C:
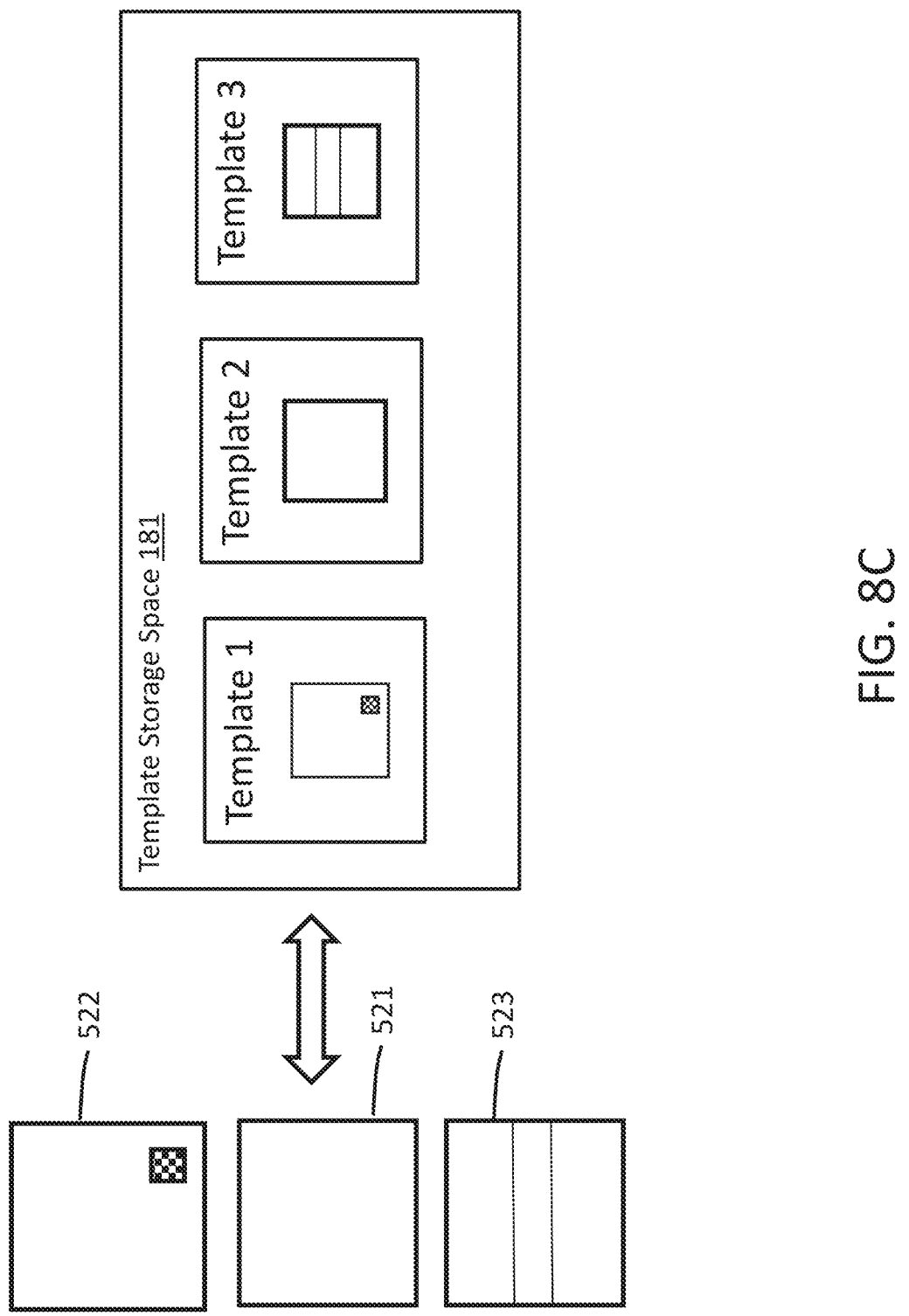

In some instances, the updated image recited above may be generated each time an entire layer of objects has been moved. For instance, FIG. 8A illustrates an example in which objects 411-414 in layer 410 of the stack of FIG. 4A has been moved by the robot 461 to a destination which is outside of the field of view 443 of the image capture device 441. FIG. 8B depicts an updated image 503 which represents objects 421-424 of the layer 420 that remains in the field of view 443. In an embodiment, the computing system 101 may be configured to extract one or more target image portions, such as target image portions 521-524, from the updated image 503. The extracted target image portions 521-524 may represent the objects 421-424, respectively. In this embodiment, the computing system 101 may be configured to repeat some or all of steps 304-312 for each of the target image portions 521-524. For example, FIG. 8C depicts an example in which each of the target image portions 521-523 are classified as being textureless, which may cause the computing system 101 to select the first template storage space 181 for performing object recognition based on those target image portions. In some scenarios, the object recognition may result in the computing system 101 determining that the target image portion 522 matches Template 1, and that the target image portion 523 matches Template 3. In some instances, the computing system 101 may determine that the target image portion 521 matches Template 2, such as by determining that an aspect ratio determined from the target image portion 521 matches an aspect ratio described in Template 2.

Figure 8D:
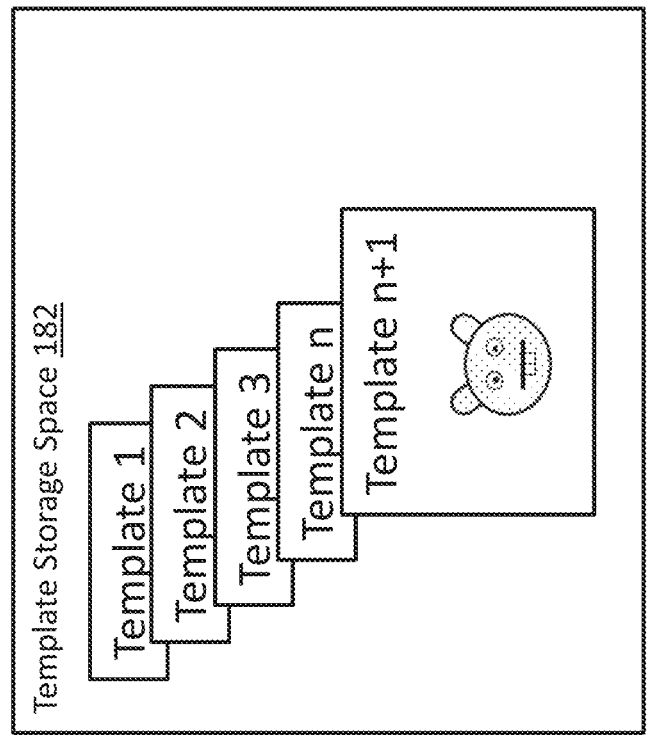
Figure 8D:
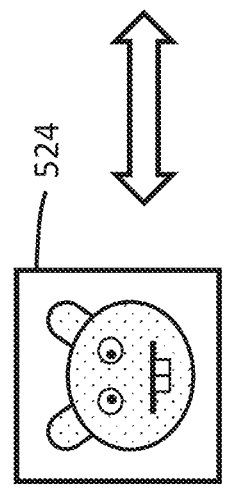

FIG. 8D further depicts an example in which the target image portion 524 is classified as being textured. As a result, the computing system 101 may select the second template storage space 182 for performing object recognition. In this example, the object recognition may result in the computing system 101 determining that the target image portion 524 matches Template n+1 in the second template storage space 182 (which may cause the computing system 101 to skip performing an object registration operation for the target image portion 524).

Figure 8E:
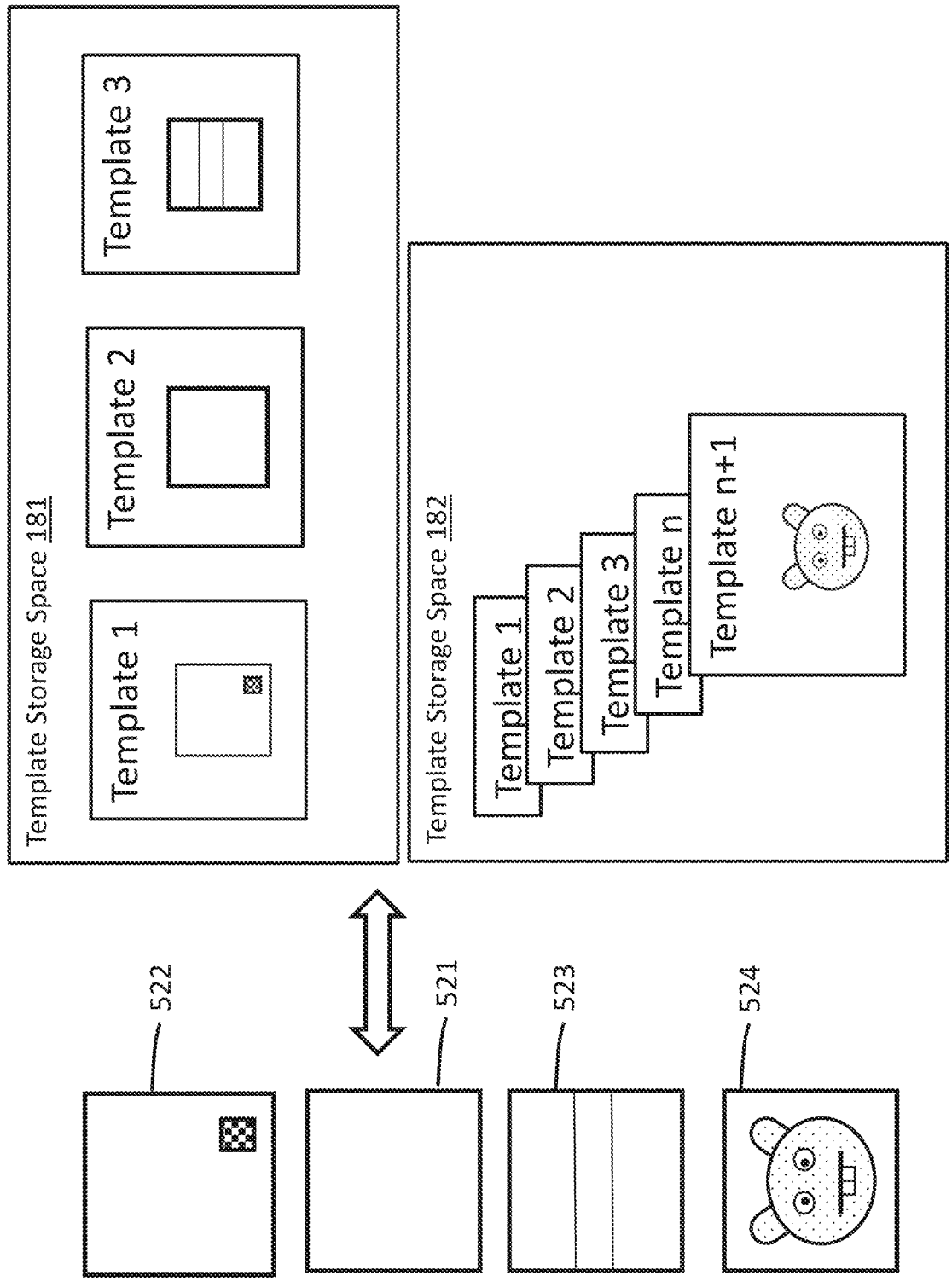

In an embodiment, the selection between the first template storage space 181 and the second template storage space 182 for object recognition may affect where a new template, if any, is stored for an object registration operation, and/or whether a textureless flag is included in the new template. The object recognition that is performed based on existing templates may be performed using only the selected template storage space, or may be performed using both the first template storage space 181 and the second template storage space 182. For instance, FIG. 8E depicts an embodiment in which the object recognition for the target image portions 521-524 involves searching both the first template storage space 181 and the second template storage space 182 for a matching template.

Figure 9A:
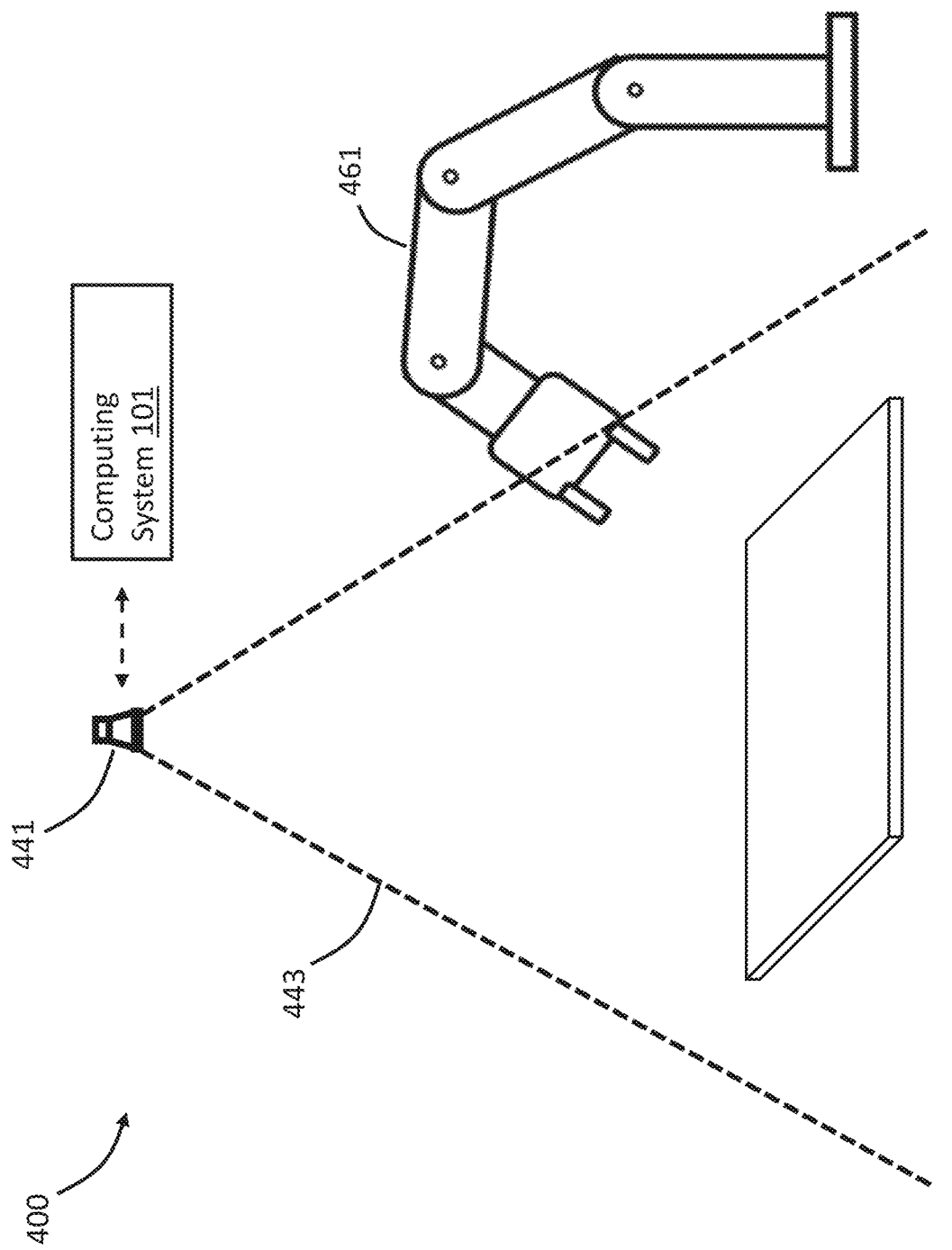
Figure 9B:
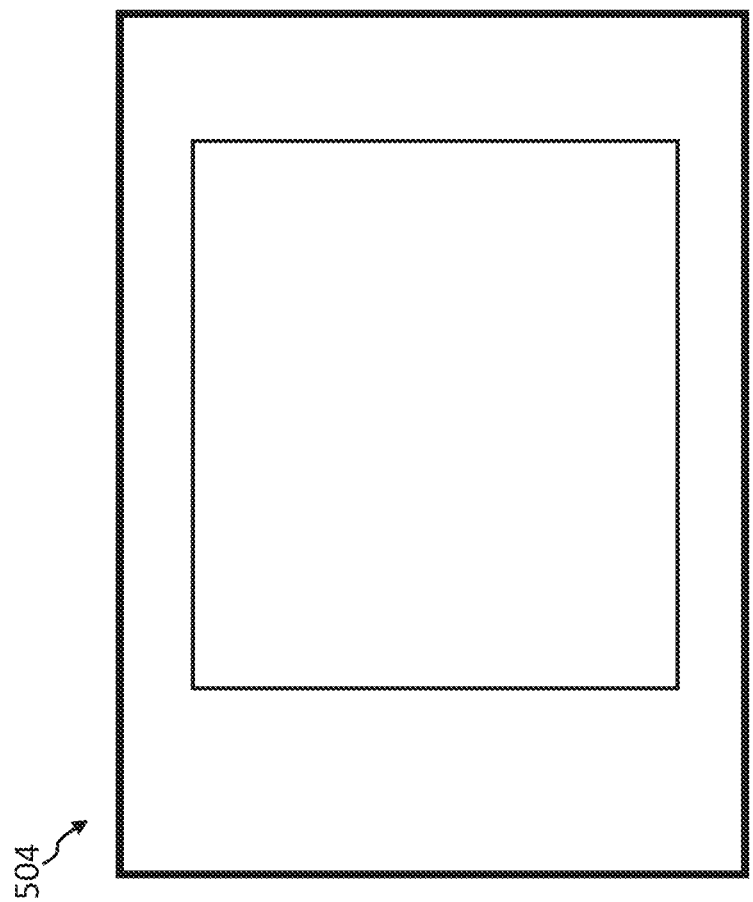
Figure 9C:
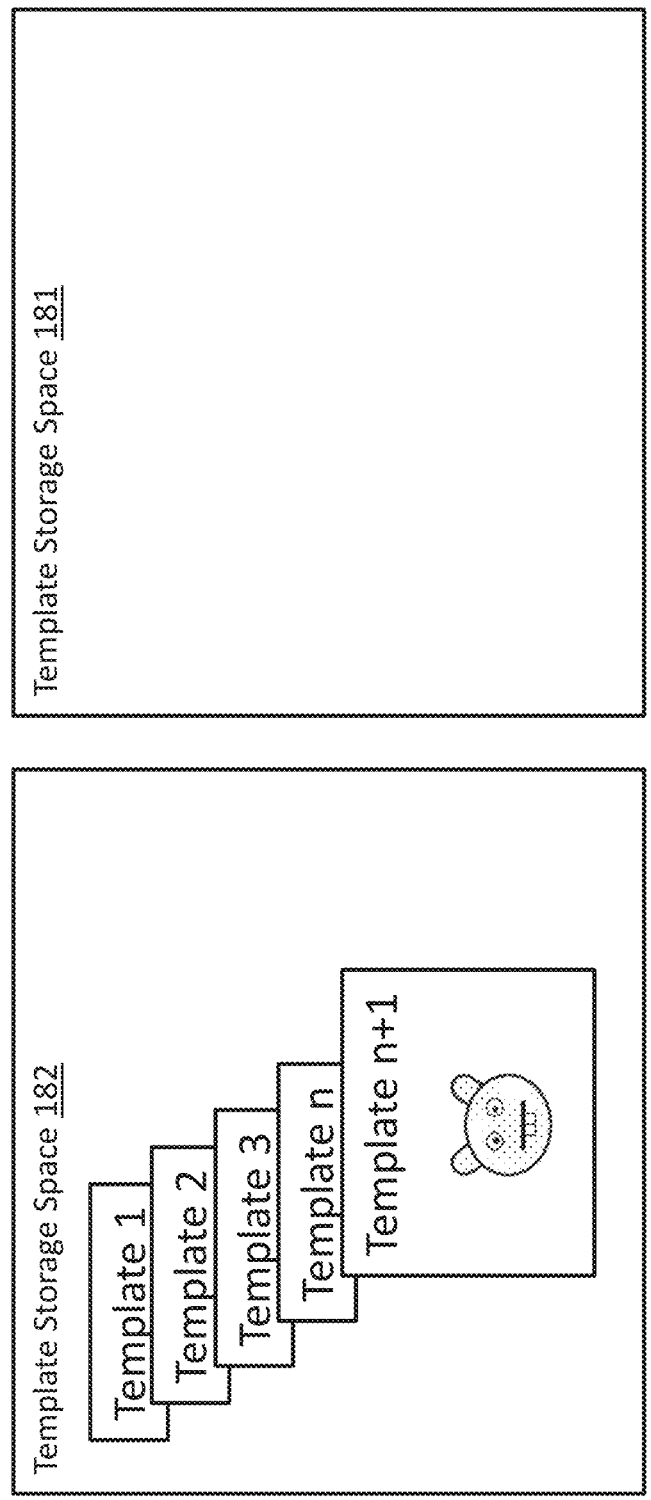

As stated above, the first template storage space 181 may be a short-term template storage space which is cleared more often relative to the second template storage space 182. In some cases, the computing system 101 may be configured to cause the first template storage space 181 to be cleared of templates upon completion or shortly after completion of a robot task. For example, FIG. 9A illustrates a situation in which a de-palletization cycle is complete. FIG. 9B illustrates an image 504 generated by the image capture device 441 in such a situation. In this example, all of the objects 411-414, 421-424 belonging to a pallet of objects may have been picked up by the robot 461 and moved to a desired destination. As illustrated in FIGS. 9A and 9B, there may be no box or other target object that remains in the field of view 443 of the image capture device 441. In some cases, the computing system 101 may be configured to determine that the de-palletization task or other robot task is complete when there is currently no object which remains for robot interaction with the robot 461. In response to such a determination, the computing system 101 may be configured to clear the first template storage space 181 without clearing the second template storage space 182. For instance, FIG. 9C depicts the computing system 101 causing Template 1 through Template 3 in the first template storage space 181 (in FIG. 8C) to be cleared therefrom, while Template 1 through Template n+1 in the second template storage space

182 may remain in that template storage space. As stated above, the templates may be cleared by removing a pointer or reference to the templates, such that they are no longer accessible. In some cases, the templates may be cleared by de-allocating a portion of the template storage space 181 which they occupied, so that the de-allocated portion can be overwritten with other data. FIG. 9D illustrates another example in which textureless templates are cleared. The example of FIG. 9D applies to the alternative embodiment in which the first template storage space 181 and the second template storage space 182 are replaced by the single template storage space 183. In this example, the computing system 101 may search for all templates in the template storage space 183 that include a textureless flag (which is illustrated in FIG. 6I), and may delete those templates.

In an embodiment, the method 300 of FIG. 3 may omit one or more of the steps in that figure, and/or may add one or more other steps. For instance, the method 300 may in some cases include a step in which the object recognition and/or the object registration is verified. Such a verification step may be performed after the object recognition in step 310 and/or before generating the movement command in step 312. In some instances, method 300 may be modified to omit step 312. In some cases, the method 300 may include a step which performs inventory management based on a result of the object recognition in step 310 and/or based on object registration. Such a step may, e.g., track what object or type of objects have been in a field of view of an image capture device (e.g., 441) and/or spatial structure sensing device (e.g., 442).

Additional Discussion of Various Embodiments

Embodiment 1 relates to a computing system that includes a communication interface and at least one processing circuit. The communication interface is configured to communicate with a robot and with an image capture device. The at least one processing circuit is configured, when one or more objects are or have been in a field of view of the image capture device, to perform a method that includes obtaining an image for representing the one or more objects, wherein the image is generated by the image capture device. The method further includes generating a target image portion from the image, wherein the target image portion is a portion of the image associated with an object of the one or more objects, and determining whether to classify the target image portion as textured or textureless. The method also includes selecting a template storage space from among a first template storage space and a second template storage space based on whether the target image portion is classified as textured or textureless, wherein the first template storage space is cleared more often relative to the second template storage space, wherein the first template storage space is selected as the template storage space in response to a determination to classify the target image portion as being textureless, and the second template storage space is selected as the template storage space in response to a determination to classify the target image portion as being textured; perform object recognition based on the target image portion and the selected template storage space. The method additionally includes generating a movement command for causing robot interaction with at least the object, wherein the movement command is generated based on a result from the object recognition.

Embodiment 2 includes the computing system of embodiment 1. In this embodiment, the at least one processing circuit is configured to perform the object recognition by determining whether the selected template storage space includes a template that matches the target image portion.

Embodiment 3 includes the computing system of embodiment 1 or 2. In this embodiment, the at least one processing circuit is configured to perform the object recognition by determining whether the selected template storage space includes one or more templates which have a visual feature description that matches the target image portion. That is, the processing circuit may detect whether the selected template storage space has any template that has a matching visual feature description.

Embodiment 4 includes the computing system of any one of embodiments 1-3. In this embodiment, the communication interface is configured to communicate with a spatial structure sensing device, and wherein the at least one processing circuit is configured to receive sensed structure information for describing an object structure associated with the object, wherein the sensed structure information is generated by the spatial structure sensing device. Further, the at least one processing circuit is configured, in response to a determination to classify the target image portion as being textureless, to perform the object recognition further by determining whether the selected template storage space includes any template which has an object structure description that matches the sensed structure information.

Embodiment 5 includes the computing system of any one of embodiments 1-4. In this embodiment, the at least one processing circuit is configured, in response to a determination that the selected template storage space includes the template that matches the target image portion, to generate the movement command based on the template.

Embodiment 6 includes the computing system of any one of embodiments 1-5. In this embodiment, the at least one processing circuit is configured, in response to a determination that the selected template storage space does not include any template which matches the target image portion: to perform object registration by generating a new template based on the target image portion, and to cause the new template to be stored in the selected template storage space. Thus, the object registration may be performed if the selected template storage space has no template which matches the target image portion.

Embodiment 7 includes the computing system of embodiment 6. In this embodiment, the at least one processing circuit is configured to generate the movement command based on the new template.

Embodiment 8 includes the computing system of embodiment 6 or 7. In this embodiment, the at least one processing circuit is configured to perform the object registration further by: detecting at least one of a corner or an edge in the target image portion in response to the determination that the selected template storage space does not include any template which matches the target image portion; and determining a region defined by at least the corner or edge in the target image portion, wherein the at least one processing circuit is configured to generate the new template based on the determined region.

Embodiment 9 includes the computing system of embodiment 8. In this embodiment, the at least one processing circuit is configured, when the selected template storage space does not include any template which matches the target image portion, to generate the movement command based on the determined region.

Embodiment 10 includes the computing system of embodiment 8 or 9. In this embodiment, the detecting of the at least one of the corner or edge in the target image portion is in response to both the determination that the selected template storage space does not include any template which matches the target image portion and the determination to classify the target image portion as being textured, and wherein the at least one processing circuit is configured to cause the new template to be stored in the second template storage space when the target image portion is classified as being textured.

Embodiment 11 includes the computing system of any one of embodiments 6-10. In this embodiment, the communication interface is configured to communicate with a spatial structure sensing device. Further in this embodiment, the at least one processing circuit is configured to receive sensed structure information for describing an object structure associated with the object, wherein the sensed structure information is generated by the spatial structure device, and wherein the at least one processing circuit is configured, when the target image portion is classified as being textureless, to generate the new template to have an object structure description which includes or is based on the sensed structure information, and to cause the new template to be stored in the first template storage space.

Embodiment 12 includes the computing system of any one of embodiments 1-11. In this embodiment, the at least one processing circuit is configured to generate the movement command further based on whether the target image portion is classified as textured or textureless.

Embodiment 13 includes the computing system of embodiments 1-12. In this embodiment, the at least one processing circuit is configured to determine whether a robot task associated with the one or more objects is complete. The at least one processing circuit is further configured, in response to a determination that the robot task is complete, to cause the first template storage space to be cleared without clearing the second template storage space.

Embodiment 14 includes the computing system of embodiment 13. In this embodiment, the at least one processing circuit is configured to determine that the robot task is complete when the at least one processing circuit determines, after generating the movement command, that there is currently no object remaining for robot interaction with the robot.

Embodiment 15 includes the computing system of any one of embodiments 1-14. In this embodiment, the at least one processing circuit is configured, when multiple objects are in the field of view of the image capture device, to cause each template which is added to the selected template storage space to be based on a respective target image portion associated with a corresponding object of the multiple objects.

Embodiment 16 includes the computing system of any one of embodiments 1-15. In this embodiment, the at least one processing circuit is configured to generate a first bitmap and a second bitmap. The first bitmap is a descriptor bitmap for identifying one or more regions of the target image portion that include one or more respective descriptors detected from the target image portion, or for indicating that a descriptor is not detected in the target image portion. The second bitmap is an edge bitmap for identifying one or more regions of the target image portion that include one or more respective edges detected from the at target image portion, or for indicating that an edge is not detected in the at target image portion. In this embodiment, the determination of whether to classify the target image portion as textured or textureless is based on the first bitmap and the second bitmap.

It will be apparent to one of ordinary skill in the relevant arts that other suitable modifications and adaptations to the methods and applications described herein can be made without departing from the scope of any of the embodiments. The embodiments described above are illustrative examples and it should not be construed that the present invention is limited to these particular embodiments. It should be understood that various embodiments disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the methods or processes). In addition, while certain features of embodiments hereof are described as being performed by a single component, module, or unit for purposes of clarity, it should be understood that the features and functions described herein may be performed by any combination of components, units, or modules. Thus, various changes and modifications may be affected by one skilled in the art without departing from the spirit or scope of the invention as defined in the appended claims.

The invention claimed is:

1. A computing system comprising:
   a communication interface configured to communicate with a robot and with an image capture device;
   at least one processing circuit configured, when one or more objects are or have been in a field of view of the image capture device, to:
      obtain an image for representing the one or more objects, wherein the image is generated by the image capture device;
      generate a target image portion from the image, wherein the target image portion is a portion of the image associated with an object of the one or more objects;
      determine whether to classify the target image portion as textured or textureless;
      select a template storage space from among a first template storage space and a second template storage space based on whether the target image portion is classified as textured or textureless, wherein the first template storage space is a short-term template storage space configured to store a first plurality of templates cleared more often relative to the second template storage space, wherein the first template storage space is selected as the template storage space in response to a determination to classify the target image portion as being textureless, and the second template storage space is a long-term template storage space configured to store a second plurality of templates selected as the template storage space in response to a determination to classify the target image portion as being textured;
      perform object recognition based on the target image portion and the selected template storage space; and
      generate a movement command for causing robot interaction with at least the object, wherein the movement command is generated based on a result from the object recognition.

2. The computing system of claim 1, wherein the at least one processing circuit is configured to perform the object recognition by determining whether the selected template storage space includes a template that matches the target image portion.

3. The computing system of claim 2, wherein the at least one processing circuit is configured to perform the object recognition by determining whether the selected template storage space includes one or more templates which have a visual feature description that matches the target image portion.

4. The computing system of claim 3, wherein the communication interface is configured to communicate with a spatial structure sensing device, and wherein the at least one processing circuit is configured to receive sensed structure information for describing an object structure associated with the object, wherein the sensed structure information is generated by the spatial structure sensing device; and
wherein the at least one processing circuit is configured, in response to a determination to classify the target image portion as being textureless, to perform the object recognition further by determining whether the selected template storage space includes one or more templates which have an object structure description that matches the sensed structure information.

5. The computing system of claim 2, wherein the at least one processing circuit is configured, in response to a determination that the selected template storage space includes the template that matches the target image portion, to generate the movement command based on the template.

6. The computing system of claim 2, wherein the at least one processing circuit is configured, in response to a determination that the selected template storage space does not include the template which matches the target image portion: to perform object registration by generating a new template based on the target image portion, and to cause the new template to be stored in the selected template storage space.

7. The computing system of claim 6, wherein the at least one processing circuit is configured to generate the movement command based on the new template.

8. The computing system of claim 6, wherein the at least one processing circuit is configured to perform the object registration further by:
detecting at least one of a corner or an edge in the target image portion in response to the determination that the selected template storage space does not include the template which match the target image portion; and
determining a region defined by at least the corner or the edge in the target image portion,
wherein the at least one processing circuit is configured to generate the new template based on the determined region.

9. The computing system of claim 8, wherein the at least one processing circuit is configured, when the selected template storage space does not include the template which matches the target image portion, to generate the movement command based on the determined region.

10. The computing system of claim 8, wherein the detecting of the at least one of the corner or the edge in the target image portion is in response to both the determination that the selected template storage space does not include the template which matches the target image portion and the determination to classify the target image portion as being textured; and
wherein the at least one processing circuit is configured to cause the new template to be stored in the second template storage space when the target image portion is classified as being textured.

11. The computing system of claim 6, wherein the communication interface is configured to communicate with a spatial structure sensing device,
wherein the at least one processing circuit is configured to receive sensed structure information for describing an object structure associated with the object, wherein the sensed structure information is generated by the spatial structure device; and
wherein the at least one processing circuit is configured, when the target image portion is classified as being textureless, to generate the new template to have an object structure description which includes or is based on the sensed structure information, and to cause the new template to be stored in the first template storage space.

12. The computing system of claim 1, wherein the at least one processing circuit is configured to generate the movement command further based on whether the target image portion is classified as textured or textureless.

13. The computing system of claim 1, wherein the at least one processing circuit is configured to:
determine whether a robot task associated with the one or more objects is complete; and
in response to a determination that the robot task is complete, cause the first template storage space to be cleared without clearing the second template storage space.

14. The computing system of claim 13, wherein the at least one processing circuit is configured to determine that the robot task is complete when the at least one processing circuit determines, after generating the movement command, that there is currently no object remaining for robot interaction with the robot.

15. The computing system of claim 1, wherein the at least one processing circuit is configured, when multiple objects are in the field of view of the image capture device, to cause each template which is added to the selected template storage space to be based on a respective target image portion associated with a corresponding object of the multiple objects.

16. The computing system of claim 1, wherein the at least one processing circuit is configured to generate a first bitmap and a second bitmap based on at least the target image portion;
wherein the first bitmap is a descriptor bitmap for identifying one or more regions of the target image portion that include one or more respective descriptors detected from the target image portion, or for indicating that a descriptor is not detected in the target image portion;
wherein the second bitmap is an edge bitmap for identifying one or more regions of the target image portion that include one or more respective edges detected from the target image portion, or for indicating that an edge is not detected in the target image portion; and
wherein the determination of whether to classify the target image portion as textured or textureless is based on the first bitmap and the second bitmap.

17. A non-transitory computer-readable medium having instructions thereon that, when executed by at least one processing circuit of a computing system, causes the at least one processing circuit to:
obtain an image, wherein the computing system is configured to communicate with an image capture device and with a robot, and wherein the image is generated by the image capture device, and is for representing one or more objects in a field of view of the image capture device;

generate a target image portion from the image, wherein the target image portion is a portion of the image associated with an object of the one or more objects;

determine whether to classify the target image portion as textured or textureless;

select a template storage space from among a first template storage space and a second template storage space based on whether the target image portion is classified as textured or textureless, wherein the first template storage space is a short-term template storage space configured to store a first plurality of templates cleared more often relative to the second template storage space, wherein the first template storage space is selected as the template storage space in response to a determination to classify the target image portion as being textureless, and the second template storage space is a long-term template storage space configured to store a second plurality of templates selected as the template storage space in response to a determination to classify the target image portion as being textured;

perform object recognition based on the target image portion and the selected template storage space; and generate a movement command for causing robot interaction with the object, wherein the movement command is generated based on a result from the object recognition.

18. The non-transitory computer-readable medium of claim 17, wherein the instructions, when executed by the at least one processing circuit, cause the at least one processing circuit to perform the object recognition by determining whether the selected template storage space includes a template that matches the target image portion, and to, in response to a determination that the selected template storage space does not include the template which matches the target image portion, perform object registration by generating a new template based on the target image portion, and by causing the new template to be stored in the selected template storage space.

19. The non-transitory computer-readable medium of claim 17, wherein the instructions, when executed by the at least one processing circuit, cause the at least one processing circuit to:

determine whether a robot task associated with the one or more objects is complete; and in response to a determination that the robot task is complete, cause the first template storage space to be cleared without clearing the second template storage space.

20. A method performed by a computing system, comprising:

obtaining an image by the computing system, wherein the computing system is configured to communicate with an image capture device and with a robot, and wherein the image is generated by the image capture device, and is for representing one or more objects in a field of view of the image capture device;

generating a target image portion from the image, wherein the target image portion is a portion of the image associated with a object of the one or more objects;

determining whether to classify the target image portion as textured or textureless;

selecting a template storage space from among a first template storage space and a second template storage space based on whether the target image portion is classified as textured or textureless, wherein the first template storage space is a short-term template storage space configured to store a first plurality of templates cleared more often relative to the second template storage space, wherein the first template storage space is selected as the template storage space in response to a determination to classify the target image portion as being textureless, and the second template storage space is a long-term template storage space configured to store a second plurality of templates selected as the template storage space in response to a determination to classify the target image portion as being textured;

performing object recognition based on the target image portion and based on the selected template storage space; and generating a movement command for causing robot interaction with the object, wherein the movement command is generated based on a result from the object recognition.

* * * * *